US009491722B2

(12) United States Patent
Yavuz et al.

(10) Patent No.: US 9,491,722 B2
(45) Date of Patent: *Nov. 8, 2016

(54) ADAPTATION OF TRANSMIT POWER BASED ON CHANNEL QUALITY

(75) Inventors: Mehmet Yavuz, San Diego, CA (US); Peter J. Black, San Diego, CA (US); Sanjiv Nanda, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 1713 days.

This patent is subject to a terminal disclaimer.

(21) Appl. No.: 12/187,312

(22) Filed: Aug. 6, 2008

(65) Prior Publication Data

US 2009/0042596 A1  Feb. 12, 2009

Related U.S. Application Data

(60) Provisional application No. 60/955,301, filed on Aug. 10, 2007, provisional application No. 60/957,967, filed on Aug. 24, 2007.

(51) Int. Cl.
| | |
|---|---|
| *H04B 7/26* | (2006.01) |
| *H04W 52/40* | (2009.01) |
| *H04W 52/24* | (2009.01) |

(Continued)

(52) U.S. Cl.
CPC ........... *H04W 52/40* (2013.01); *H04W 52/244* (2013.01); *H04W 16/16* (2013.01); *H04W 36/04* (2013.01); *H04W 52/143* (2013.01); *H04W 52/245* (2013.01); *H04W 52/367* (2013.01)

(58) Field of Classification Search
USPC .......................................... 455/522; 370/318
See application file for complete search history.

(56) References Cited

U.S. PATENT DOCUMENTS

| | | |
|---|---|---|
| 5,276,907 A | 1/1994 | Meidan |
| 5,722,044 A | 2/1998 | Padovani et al. |

(Continued)

FOREIGN PATENT DOCUMENTS

| | | |
|---|---|---|
| CN | 1126930 | 7/1996 |
| CN | 1476687 A | 2/2004 |

(Continued)

OTHER PUBLICATIONS

Dorot V. and others. Glossary of Modern Computer Vocabulary, second edition, BHV-Petersburg, Sankt-Petersburg, 2001, D2—p. 339.

(Continued)

*Primary Examiner* — Bobbak Safaipour
(74) *Attorney, Agent, or Firm* — Jia J. Wu

(57) ABSTRACT

Transmit power (e.g., maximum transmit power) may be defined based on the maximum received signal strength allowed by a receiver and a minimum coupling loss from a transmitting node to a receiver. Transmit power may be defined for an access node (e.g., a femto node) such that a corresponding outage created in a cell (e.g., a macro cell) is limited while still providing an acceptable level of coverage for access terminals associated with the access node. An access node may autonomously adjust its transmit power based on channel measurement and a defined coverage hole to mitigate interference. Transmit power may be defined based on channel quality. Transmit power may be defined based on a signal-to-noise ratio at an access terminal. The transmit power of neighboring access nodes also may be controlled by inter-access node signaling.

38 Claims, 18 Drawing Sheets

(51) Int. Cl.
*H04W 16/16* (2009.01)
*H04W 36/04* (2009.01)
*H04W 52/14* (2009.01)
*H04W 52/36* (2009.01)

(56) References Cited

U.S. PATENT DOCUMENTS

| | | | |
|---|---|---|---|
| 6,615,044 B2 * | 9/2003 | Tigerstedt | H04W 36/0088 370/331 |
| 6,804,352 B2 | 10/2004 | Miller et al. | |
| 6,879,572 B1 | 4/2005 | Ayyagari et al. | |
| 7,099,384 B1 | 8/2006 | Jalali et al. | |
| 7,330,446 B2 | 2/2008 | Lee et al. | |
| 7,539,506 B2 | 5/2009 | Jang et al. | |
| 7,702,351 B2 | 4/2010 | Soliman | |
| 7,733,823 B2 * | 6/2010 | Kim | H04W 52/367 370/328 |
| 7,760,681 B1 | 7/2010 | Chhabra | |
| 7,917,164 B2 * | 3/2011 | Rao | H04W 52/10 455/522 |
| 7,929,493 B2 * | 4/2011 | Kim | H04W 52/367 370/328 |
| 8,014,802 B1 * | 9/2011 | Chhabra | H04W 52/242 342/463 |
| 2001/0051530 A1 | 12/2001 | Shiotsu et al. | |
| 2002/0085504 A1 * | 7/2002 | Zeira | H04W 52/10 370/252 |
| 2002/0193115 A1 | 12/2002 | Furukawa et al. | |
| 2003/0045321 A1 | 3/2003 | Kim et al. | |
| 2003/0119452 A1 | 6/2003 | Kim et al. | |
| 2003/0153272 A1 | 8/2003 | Takano | |
| 2004/0095907 A1 * | 5/2004 | Agee | H04B 7/0417 370/334 |
| 2004/0097223 A1 * | 5/2004 | Bellec | H04W 36/30 455/422.1 |
| 2004/0214590 A1 * | 10/2004 | Al-Housami | H04W 48/14 455/515 |
| 2004/0229603 A1 * | 11/2004 | Sato | H04W 52/40 455/422.1 |
| 2005/0130662 A1 | 6/2005 | Murai | |
| 2005/0147074 A1 | 7/2005 | Maufer et al. | |
| 2005/0265292 A1 | 12/2005 | Atsuta | |
| 2006/0063543 A1 * | 3/2006 | Matoba | H04L 1/0003 455/509 |
| 2006/0099985 A1 | 5/2006 | Whinnett et al. | |
| 2006/0111137 A1 | 5/2006 | Mori et al. | |
| 2006/0116154 A1 * | 6/2006 | Han | H04W 52/16 455/522 |
| 2006/0146762 A1 * | 7/2006 | Kuroda | H04L 1/0017 370/335 |
| 2006/0165032 A1 | 7/2006 | Hamalainen et al. | |
| 2007/0010269 A1 | 1/2007 | Azuma | |
| 2007/0042799 A1 | 2/2007 | Jubin et al. | |
| 2007/0135131 A1 * | 6/2007 | Ishii | H04L 12/5695 455/453 |
| 2007/0173276 A1 * | 7/2007 | Love | H04W 52/367 455/522 |
| 2007/0197253 A1 | 8/2007 | Watanabe et al. | |
| 2007/0264952 A1 * | 11/2007 | Buchwald | H04W 48/02 455/186.1 |
| 2007/0270151 A1 * | 11/2007 | Claussen | H04W 16/32 455/444 |
| 2008/0009243 A1 * | 1/2008 | Hart | H04W 52/46 455/67.13 |
| 2008/0146231 A1 * | 6/2008 | Huang | H04L 1/20 455/436 |
| 2008/0166976 A1 * | 7/2008 | Rao | H04W 52/10 455/69 |
| 2009/0005109 A1 | 1/2009 | Nishio et al. | |
| 2009/0042593 A1 | 2/2009 | Yavuz et al. | |
| 2009/0042594 A1 | 2/2009 | Yavuz et al. | |
| 2009/0042595 A1 | 2/2009 | Yavuz et al. | |
| 2009/0046632 A1 | 2/2009 | Nanda et al. | |
| 2009/0047931 A1 | 2/2009 | Nanda et al. | |
| 2009/0080386 A1 | 3/2009 | Yavuz et al. | |
| 2009/0080499 A1 | 3/2009 | Yavuz et al. | |
| 2009/0081970 A1 | 3/2009 | Yavuz et al. | |
| 2009/0082026 A1 | 3/2009 | Yavuz et al. | |
| 2009/0082027 A1 | 3/2009 | Yavuz et al. | |
| 2009/0086861 A1 | 4/2009 | Yavuz et al. | |
| 2009/0135796 A1 | 5/2009 | Nanda et al. | |
| 2009/0254789 A1 * | 10/2009 | Chen | H04L 1/0006 714/746 |
| 2010/0202363 A1 * | 8/2010 | Kim | H04W 52/367 370/328 |
| 2012/0087268 A1 | 4/2012 | Savoor et al. | |

FOREIGN PATENT DOCUMENTS

| | | |
|---|---|---|
| CN | 1497888 A | 5/2004 |
| CN | 1870468 A | 11/2006 |
| CN | 1945995 A | 4/2007 |
| EP | 0682418 A2 | 11/1995 |
| EP | 1289166 | 3/2003 |
| EP | 1879403 A1 | 1/2008 |
| GB | 2432751 | 5/2007 |
| JP | 2000022589 A | 1/2000 |
| JP | 2000295172 A | 10/2000 |
| JP | 2001309425 A | 11/2001 |
| JP | 2001345756 A | 12/2001 |
| JP | 2003234697 A | 8/2003 |
| JP | 2005501471 A | 1/2005 |
| JP | 2005347922 A | 12/2005 |
| JP | 2006340008 A | 12/2006 |
| JP | 2007019594 A | 1/2007 |
| JP | 2007129405 A | 5/2007 |
| JP | 2007150860 A | 6/2007 |
| KR | 20020038127 A | 5/2002 |
| RU | 2120183 C1 | 10/1998 |
| RU | 2232484 C2 | 7/2004 |
| RU | 2236757 | 9/2004 |
| TW | 200727712 | 7/2007 |
| WO | WO9427381 A1 | 11/1994 |
| WO | 9900914 | 1/1999 |
| WO | 9914869 | 3/1999 |
| WO | WO0008706 A2 | 2/2000 |
| WO | WO-0079805 A1 | 12/2000 |
| WO | WO 0227966 A2 * | 4/2002 |
| WO | WO-03019819 A1 | 3/2003 |
| WO | WO 2006010958 A2 * | 2/2006 |
| WO | WO-2006011347 A1 | 2/2006 |
| WO | WO-2006043588 A1 | 4/2006 |
| WO | 2006067672 | 6/2006 |
| WO | WO-2006089196 A1 | 8/2006 |
| WO | WO-2007090053 A1 | 8/2007 |
| WO | 2008107425 | 9/2008 |

OTHER PUBLICATIONS

Claussen, et al., "An overview of the femtocell concept," Bell Labs Technical Journal, Wiley, CA, US, vol. 1, No. 13, Mar. 21, 2008, pp. 221-245, XP001512256.
"3rd Generation Partnership Project; Technical Specification Group Radio Access Networks; 3G Home NodeB Study Item Technical Report (Release 8) 3GPP TR 25.820 V8.1.0" Sophia Antipolis, FR May 1, 2008, pp. 1-35, XP002508020.
International Search Report—PCT/US08/072676, International Searching Authority—European Patent Office, Mar. 27, 2009.
Written Opinion—PCT/US08/072676, International Searching Authority—European Patent Office, Mar. 27, 2009.
Taiwan Search Report—TW097130464—TIPO—Nov. 12, 2011.
3GPP TSG RAN WG2 #58bis: "Use of cell specific offsets and reading neighbour BCH", NTT DoCoMo, Telecom Italia, T-Mobile, Tdoc-R2-072721, Jun. 22, 2007, pp. 9.
U.S. Appl. No. 14/307,416, filed on Jun. 17, 2014 by Mehmet Yavuz.

* cited by examiner

ADAPTATION OF TRANSMIT POWER BASED ON CHANNEL QUALITY

CLAIM OF PRIORITY UNDER 35 U.S.C. §119

This application claims the benefit of and priority to commonly owned U.S. Provisional Patent Application No. 60/955,301, filed Aug. 10, 2007, and U.S. Provisional Patent Application No. 60/957,967, filed Aug. 24, 2007, the disclosure of each of which is hereby incorporated by reference herein.

CROSS-REFERENCE TO RELATED APPLICATION

This application is related to concurrently filed and commonly owned U.S. patent application Ser. No. 12/187,307, entitled "ADAPTATION OF TRANSMIT POWER BASED ON MAXIMUM RECEIVED SIGNAL STRENGTH"; U.S. patent application Ser. No. 12/187,310, entitled "AUTONOMOUS ADAPTATION OF TRANSMIT POWER"; and U.S. patent application Ser. No. 12/187,304, entitled "ADAPTATION OF TRANSMIT POWER FOR NEIGHBORING NODES"; the disclosure of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement the base stations of a conventional mobile phone network (e.g., a macro cellular network), small-coverage base stations may be deployed, for example, in a user's home. Such small-coverage base stations are generally known as access point base stations, home NodeBs, or femto cells and may be used to provide more robust indoor wireless coverage to mobile units. Typically, such small-coverage base stations are connected to the Internet and the mobile operator's network via a DSL router or a cable modem.

In a typical macro cellular deployment the RF coverage is planned and managed by cellular network operators to optimize coverage. Femto base stations, on the other hand, may be installed by the subscriber personally and deployed in an ad-hoc manner. Consequently, femto cells may cause interference both on the uplink ("UL") and downlink ("DL") of the macro cells. For example, a femto base station installed near a window of a residence may cause significant downlink interference to any access terminals outside the house that are not served by the femto cell. Also, on the uplink, home access terminals that are served by a femto cell may cause interference at a macro cell base station (e.g., macro NodeB).

Interference between the macro and femto deployments may be mitigated by operating the femto network on a separate RF carrier frequency than the macro cellular network.

Femto cells also may interfere with one another as a result of unplanned deployment. For example, in a multi-resident apartment, a femto base station installed near a wall separating two residences may cause significant interference to a neighboring residence. Here, the strongest femto base station seen by a home access terminal (e.g., strongest in terms of RF signal strength received at the access terminal) may not necessarily be the serving base station for the access terminal due to a restricted association policy enforced by that femto base station.

RF interference issues may thus arise in a communication system where radio frequency ("RF") coverage of femto base stations is not optimized by the mobile operator and where deployment of such base stations is ad-hoc. Thus, there is a need for improved interference management for wireless networks.

SUMMARY

A summary of sample aspects of the disclosure follows. It should be understood that any reference to the term aspects herein may refer to one or more aspects of the disclosure.

The disclosure relates in some aspect to determining transmit power (e.g., maximum power) based on the maximum received signal strength allowed by a receiver and based on a minimum coupling loss from a transmitting node to a receiver. In this way, desensitization of the receiver may be avoided in a system where there is a relatively small path loss between these components (e.g., where the receiver may be arbitrarily close to the transmitter).

The disclosure relates in some aspects to defining transmit power for an access node (e.g., a femto node) such that a corresponding outage (e.g., a coverage hole) created in a cell (e.g., a macro cell) is limited while still providing an acceptable level of coverage for access terminals associated with the access node. In some aspects, these techniques may be employed for coverage holes in adjacent channels (e.g., implemented on adjacent RF carriers) and in co-located channels (e.g., implemented on the same RF carrier).

The disclosure relates in some aspects to autonomously adjusting downlink transmit power at an access node (e.g., a femto node) to mitigate interference. In some aspects, the transmit power is adjusted based on channel measurement and a defined coverage hole. Here, a mobile operator may specify coverage hole and/or channel characteristics used to adjust the transmit power.

In some implementations an access node measures (or receives an indication of) the received signal strength of signals from a macro access node and predicts a path loss relating to the coverage hole in the macro cell (e.g., corrected for penetration loss, etc.). Based on a coverage target (path loss), the access node may select a particular transmit power value. For example, transmit power at the access node may be adjusted based on measured macro signal strength (e.g., RSCP) and total signal strength (e.g., RSSI) measured at a macro node level.

The disclosure relates in some aspects to defining transmit power based on channel quality. For example, an access node may commence operation with a default transmit power (e.g., pilot fraction value) when it is installed and later dynamically adjust the transmit power based on DRC/CQI feedback from an access terminal. In some aspects, if requested DRC over a long time period is always very high, this is an indication that the PF value may be too high and the access node may elect to operate at lower value.

The disclosure relates in some aspects to defining transmit power based on signal-to-noise ratio at an access terminal.

For example, a maximum transmit power may be defined for an access node to ensure that the signal-to-noise ratio at an associated access terminal does not exceed a defined maximum value when the access terminal is at or near an edge of a coverage area for the access node.

The disclosure relates in some aspects to adaptively adjusting the downlink transmit power of neighboring access nodes. In some aspects, sharing of information between access nodes may be utilized to enhance network performance. For example, if an access terminal is experiencing high interference levels from a neighboring access node, information relating to this interference may be relayed to the neighbor access node via the home access node of the access terminal. As a specific example, the access terminal may send a neighbor report to its home access node, whereby the report indicates the received signal strength the access terminal sees from neighboring access nodes. The access node may then determine whether the home access terminal is being unduly interfered with by one of the access nodes in the neighbor report. If so, the access node may send a message to the interfering access node requesting that the access node reduce its transmit power. Similar functionality may be achieved through the use of a centralized power controller.

BRIEF DESCRIPTION OF THE DRAWINGS

These and other sample aspects of the disclosure will be described in the detailed description and the appended claims that follow, and in the accompanying drawings, wherein:

Figure 1:
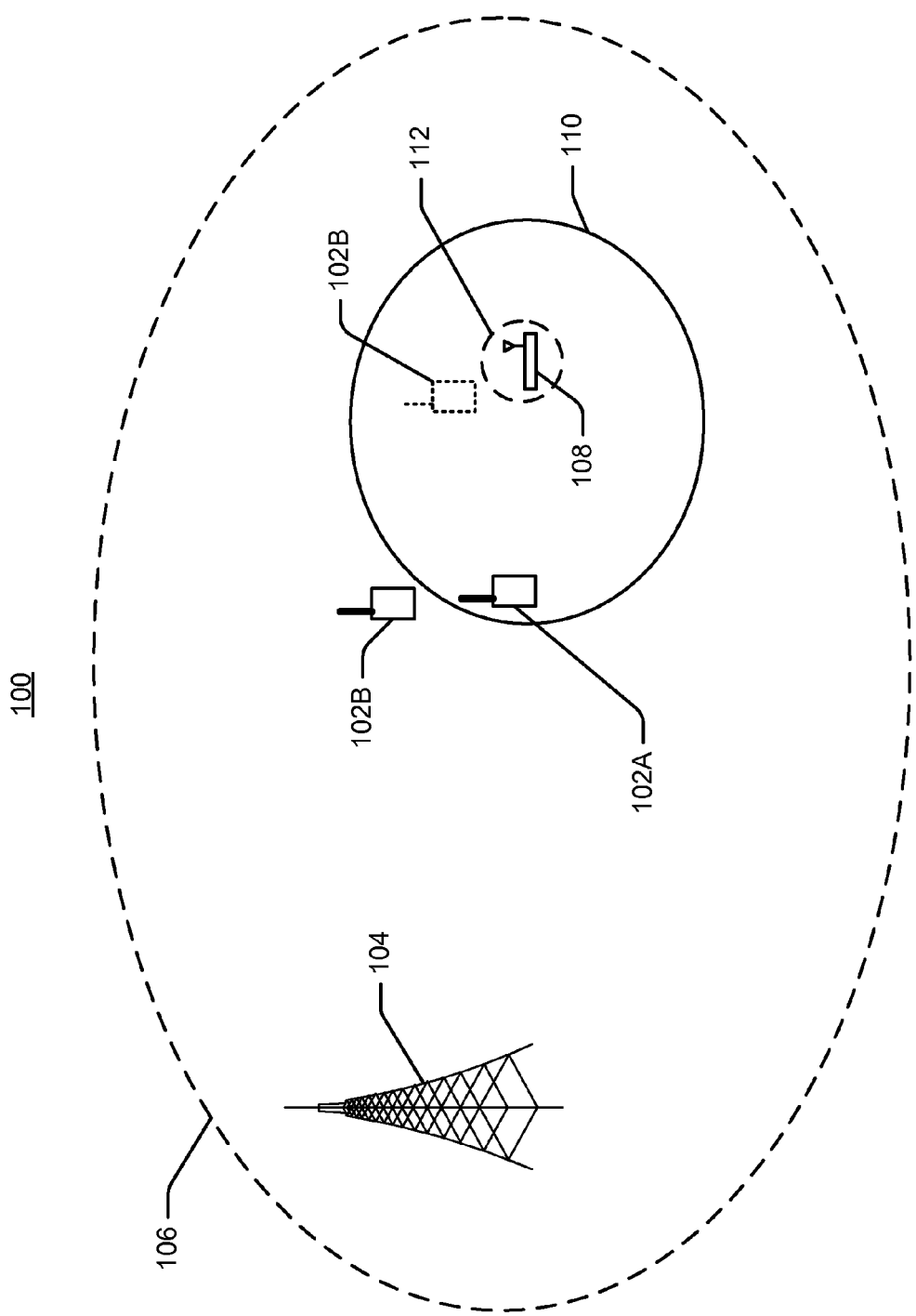
FIG. 1 is a simplified diagram of several sample aspects of a communication system including macro coverage and smaller scale coverage.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates sample aspects of a network system 100 that includes macro scale coverage (e.g., a large area cellular network such as a 3G network, which may be commonly referred to as a macro cell network) and smaller scale coverage (e.g., a residence-based or building-based network environment). As a node such as access terminal 102A moves through the network, the access terminal 102A may be served in certain locations by access nodes (e.g., access node 104) that provide macro coverage as represented by the area 106 while the access terminal 102A may be served at other locations by access nodes (e.g., access node 108) that provide smaller scale coverage as represented by the area 110. In some aspects, the smaller coverage nodes may be used to provide incremental capacity growth, in-building coverage, and different services (e.g., for a more robust user experience).

As will be discussed in more detail below, the access node 108 may be restricted in that it may not provide certain services to certain nodes (e.g., a visitor access terminal 102B). As a result, a coverage hole (e.g., corresponding to the coverage area 110) may be created in the macro coverage area 104.

The size of the coverage hole may depend on whether the access node 104 and the access node 108 are operating on the same frequency carrier. For example, when the nodes 104 and 108 are on a co-channel (e.g., using the same frequency carrier), the coverage hole may correspond to the coverage area 110. Thus, in this case the access terminal 102A may lose macro coverage when it is within the coverage area 110 (e.g., as indicated by the phantom view of the access terminal 102B).

When the nodes 104 and 108 are on adjacent channels (e.g., using different frequency carriers), a smaller coverage hole 112 may be created in the macro coverage area 104 as a result of adjacent channel interference from the access node 108. Thus, when the access terminal 102A is operating on an adjacent channel, the access terminal 102A may receive macro coverage at a location that is closer to the access node 108 (e.g., just outside the coverage area 112).

Depending on system design parameters, the co-channel coverage hole may be relatively large. For example, if the interference of the access node 108 is at least as low as the thermal noise floor, the coverage hole may have a radius on the order of 40 meters for a CDMA system where the transmit power of the access node 108 is 0 dBm, assuming free space propagation loss and a worst case where there is no wall separation between the nodes 108 and 102B.

A tradeoff thus exists between minimizing the outage in the macro coverage while maintaining adequate coverage within a designated smaller scale environment (e.g., femto node coverage inside a home). For example, when a restricted femto node is at the edge of the macro coverage, as a visiting access terminal approaches the femto node, the visiting access terminal is likely to lose macro coverage and drop the call. In such a case, one solution for the macro cellular network would be to move the visitor access terminal to another carrier (e.g., where the adjacent channel interference from the femto node is small). Due to limited spectrum available to each operator, however, the use of separate carrier frequencies may not always be practical. In any event, another operator may be using the carrier used by the femto node. Consequently, a visitor access terminal associated with that other operator may suffer from the coverage hole created by the restricted femto node on that carrier.

As will be described in detail in conjunction with FIGS. 2-13B, a transmit power value for a node may be defined to manage such interference and/or address other similar issues. In some implementations, the defined transmit power may relate to at least one of: a maximum transmit power, transmit power for a femto node, or transmit power for transmitting a pilot signal (e.g., as indicated by a pilot fraction value).

For convenience, the following describes various scenarios where transmit power is defined for a femto node deployed within a macro network environment. Here, the term macro node refers in some aspects to a node that provides coverage over a relatively large area. The term femto node refers in some aspects to a node that provides coverage over a relatively small area (e.g., a residence). A node that provides coverage over an area that is smaller than a macro area and larger than a femto area may be referred to as a pico node (e.g., providing coverage within a commercial building). It should be appreciated that the teachings herein may be implemented with various types of nodes and systems. For example, a pico node or some other type of nod may provide the same or similar functionality as a femto node for a different (e.g., larger) coverage area. Thus, a pico node may be restricted, a pico node may be associated with one or more home access terminals, and so on.

In various applications, other terminology may be used to reference a macro node, a femto node, or a pico node. For example, a macro node may be configured or referred to as an access node, base station, access point, eNodeB, macro cell, macro NodeB ("MNB"), and so on. Also, a femto node may be configured or referred to as a home NodeB ("HNB"), home eNodeB, access point base station, femto cell, and so on. Also, a cell associated with a macro node, a femto node, or a pico node may be referred to as a macro cell, a femto cell, or a pico cell, respectively. In some implementations, each cell may be further associated with (e.g., divided into) one or more sectors.

As mentioned above, a femto node may be restricted in some aspects. For example, a given femto node may only provide service to a limited set of access terminals. Thus, in deployments with so-called restricted (or closed) association, a given access terminal may be served by the macro cell mobile network and a limited set of femto nodes (e.g., femto nodes that reside within a corresponding user residence).

The restricted provisioned set of access terminals associated a restricted femto node (which may also be referred to as a Closed Subscriber Group Home NodeB) may be temporarily or permanently extended as necessary. In some aspects, a Closed Subscriber Group ("CSG") may be defined as the set of access nodes (e.g., femto nodes) that share a common access control list of access terminals. In some implementations, all femto nodes (or all restricted femto nodes) in a region may operate on a designated channel, which may be referred to as the femto channel.

Various relationships may be defined between a restricted femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate. A guest femto node may refer to a femto node on which an access terminal is temporarily authorized to access or operate. An alien femto node may refer to a femto node on which the access terminal is not authorized to access or operate, except for perhaps emergency situations (e.g., 911 calls).

From the perspective of a restricted femto node, a home access terminal (or home user equipment, "HUE") may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations such as 911 calls. Thus, in some aspects an alien access terminal may be defined as one that does not have the credentials or permission to register with the restricted femto node. An access terminal that is currently restricted (e.g., denied access) by a restricted femto cell may be referred to herein as a visitor access terminal. A visitor access terminal may thus correspond to an alien access terminal and, when service is not allowed, a guest access terminal.

Figure 2:
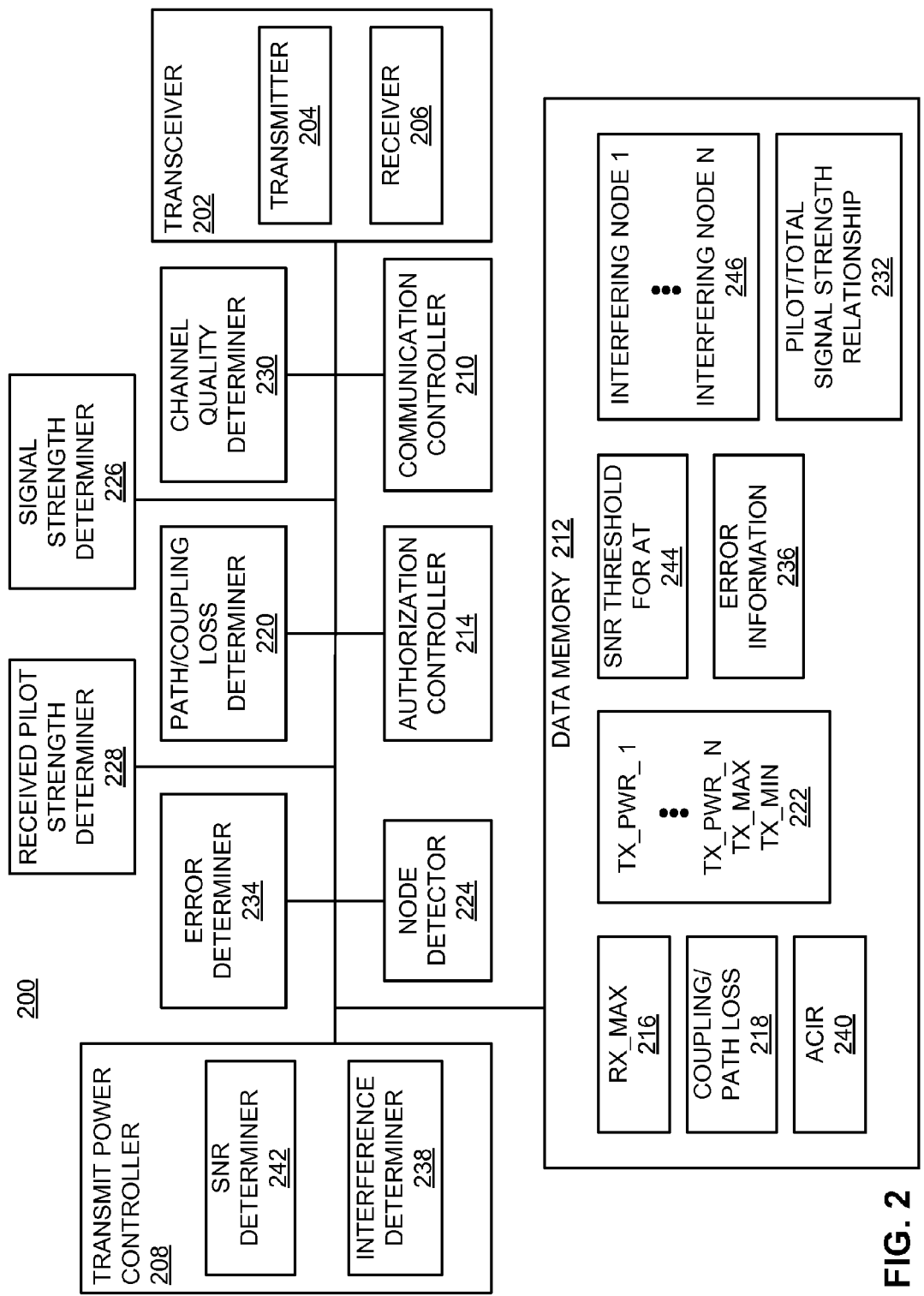
FIG. 2 is a simplified block diagram of several sample aspects of an access node.

FIG. 2 illustrates various components of an access node 200 (hereafter referred to as femto node 200) that may be used in one or more implementations as taught herein. For example, different configurations of the components depicted in FIG. 2 may be employed for the different examples of FIGS. 3-13B. It should thus be appreciated that in some implementations a node may not incorporate all of the components depicted in FIG. 2 while in other implementations (e.g., where a node uses multiple algorithms to determine a maximum transmit power) a node may employ most or all of the components depicted in FIG. 2.

Briefly, the femto node 200 includes a transceiver 202 for communicating with other nodes (e.g., access terminals).

The transceiver 202 includes a transmitter 204 for sending signals and a receiver 206 for receiving signals. The femto node 200 also includes a transmit power controller 208 for determining transmit power (e.g., maximum transmit power) for the transmitter 204. The femto node 200 includes a communication controller 210 for managing communications with other nodes and for providing other related functionality as taught herein. The femto node 200 includes one or more data memories 212 for storing various information. The femto node 200 also may include an authorization controller 210 for managing access to other nodes and for providing other related functionality as taught herein. The other components illustrated in FIG. 2 are described below.

Sample operations of the system 100 and the femto node 200 will be described in conjunction with the flowcharts of FIGS. 3-6, 9, 10, and 12-13B. For convenience, the operations of FIGS. 3-6, 9, 10, and 12-13B (or any other operations discussed or taught herein) may be described as being performed by specific components (e.g., components of the femto node 200). It should be appreciated, however, that these operations may be performed by other types of components and may be performed using a different number of components. It also should be appreciated that one or more of the operations described herein may not be employed in a given implementation.

Figure 3:
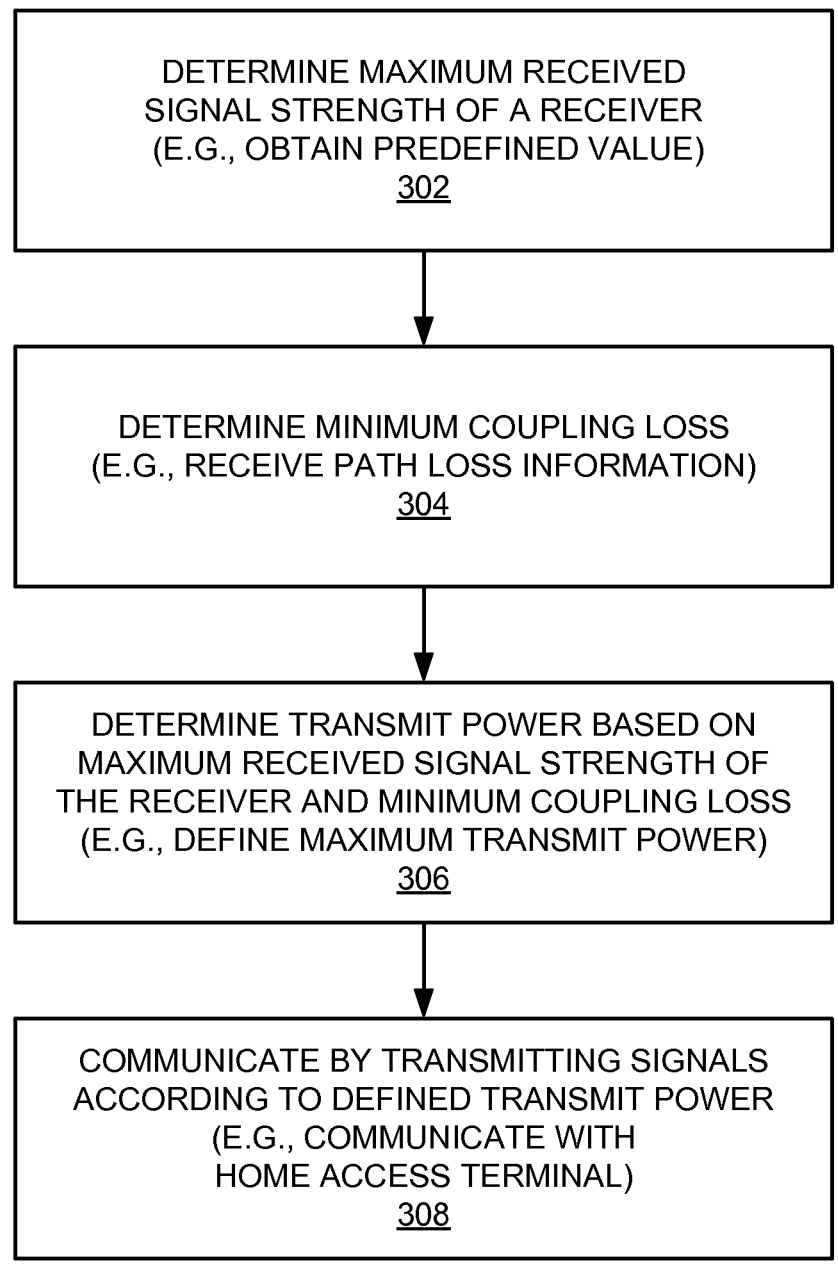
FIG. 3 is a flowchart of several sample aspects of operations that may be performed to determine transmit power based on maximum received signal strength of a receiver and minimum coupling loss.

Referring initially to FIG. 3, the disclosure relates in some aspects to defining transmit power for a transmitter based on a maximum received signal strength of a receiver and a minimum coupling loss between the transmitter and a receiver. Here, an access terminal may be designed to operate within a certain dynamic range where a lower limit is defined by a minimum performance specification. For example, a maximum received signal strength (RX_MAX) of a receiver may be specified as −30 dBm.

For certain applications (e.g., employing femto nodes), an access node and its associated access terminal may be arbitrarily close to one another, thereby potentially creating relatively high signal levels at the receiver. Assuming in one example a minimum separation of 20 cm between the femto node and an access terminal, the minimum path loss, also known as the minimum coupling loss ("MCL"), would be approximately 28.5 dB. This MCL value is much smaller than typical MCL values observed in macro cell deployments (e.g., because the macro antennas are typically installed on top of towers or buildings).

If the received power level exceeds the sensitivity range of a receiver, internal and external jammers and blockers of the receiver may suffer and, as a result, inter-modulation performance of the access terminal may degrade. Moreover, if the received signal strength is very high (e.g., above 5 dBm) actual hardware damage may occur at the access terminal. For example, an RF duplexer or a SAW filter may be permanently damaged in this case.

Accordingly, in some aspects the maximum transmit power ($P_{MAX\_HNB}$) may be defined as: $P_{MAX\_HNB} < P_{HUE\_MAX} = (MCL+RX\_MAX)$. As an example, assuming MCL is 28.5 dB and Rx MAX is −30 dBm, the maximum power that may be transmitted to a home access terminal ($P_{HUE\_MAX}$) is: 28.5−30=−1.5 dBm. Therefore, $P_{MAX\_HNB} < −1.5$ dBm in this example.

FIG. 3 illustrates several operations that may be performed to determine transmit power based on the maximum received signal strength of a receiver and MCL. As represented by block 302, the femto node 200 determines the maximum received signal strength (RX_MAX). In some cases this value may simply be a design parameter that is predefined (e.g., when the femto node 200 is provisioned). Thus, determining this value may simply involve retrieving a corresponding value 216 from the data memory 212. In some cases, the maximum received signal strength may be a configurable parameter. For example, determining maximum received signal strength may involve the node (e.g., the receiver 206) receiving an indication of the maximum received signal strength from another node (e.g., an access terminal).

As represented by block 304, the femto node 200 determines the minimum coupling loss. In some cases this value may be a design parameter that is predefined (e.g., when the femto node 200 is provisioned). Thus, determining the minimum coupling loss may involve retrieving a corresponding value 218 from the data memory 212. In some cases the minimum coupling loss may be a configurable parameter. For example, determining minimum coupling loss may involve the femto node 200 (e.g., the receiver 206) receiving an indication of the minimum coupling loss from another node (e.g., an access terminal). In addition, in some cases determining minimum coupling loss may involve the node (e.g., a coupling/path loss determiner 220) calculating the minimum coupling loss (e.g., based on a received signal strength report received from another node such a home access terminal).

As represented by block 306, the femto node 200 (e.g., the transmit power controller 208) determines the transmit power based on the maximum received signal strength and the minimum coupling loss. As discussed above, this may involve defining a maximum transmit power to be less than the sum of these two parameters.

In some cases, the transmit power value determined at block 306 is but one of several maximum transmit power values determined by the femto node 200. For example, the femto node 200 may employ other algorithms (e.g., as discussed below) to determine maximum transmit power values (e.g., TX_PWR_1 . . . TX_PWR_N) based on other criteria. The femto node 200 may then select the lowest of these determined transmit power values as the actual "maximum" transmit power value. In some cases, the determination of this "maximum" transmit power value also may be subject to constraints of a minimum transmit power value TX_MIN (e.g., to ensure that the femto node 200 provides sufficient coverage for its home access terminals) and an absolute maximum transmit power value TX_MAX. As illustrated in FIG. 2, the above transmit power parameters 222 may be stored in the data memory 212.

As represented by block 308, the femto node 200 may then communicate with another node or other nodes by transmitting signals constrained according to the determined transmit power. For example, a femto node may limit its transmit power to remain below a determined maximum value to avoid desensitizing any visiting access terminals that may come in close proximity to the femto node.

Figure 4:
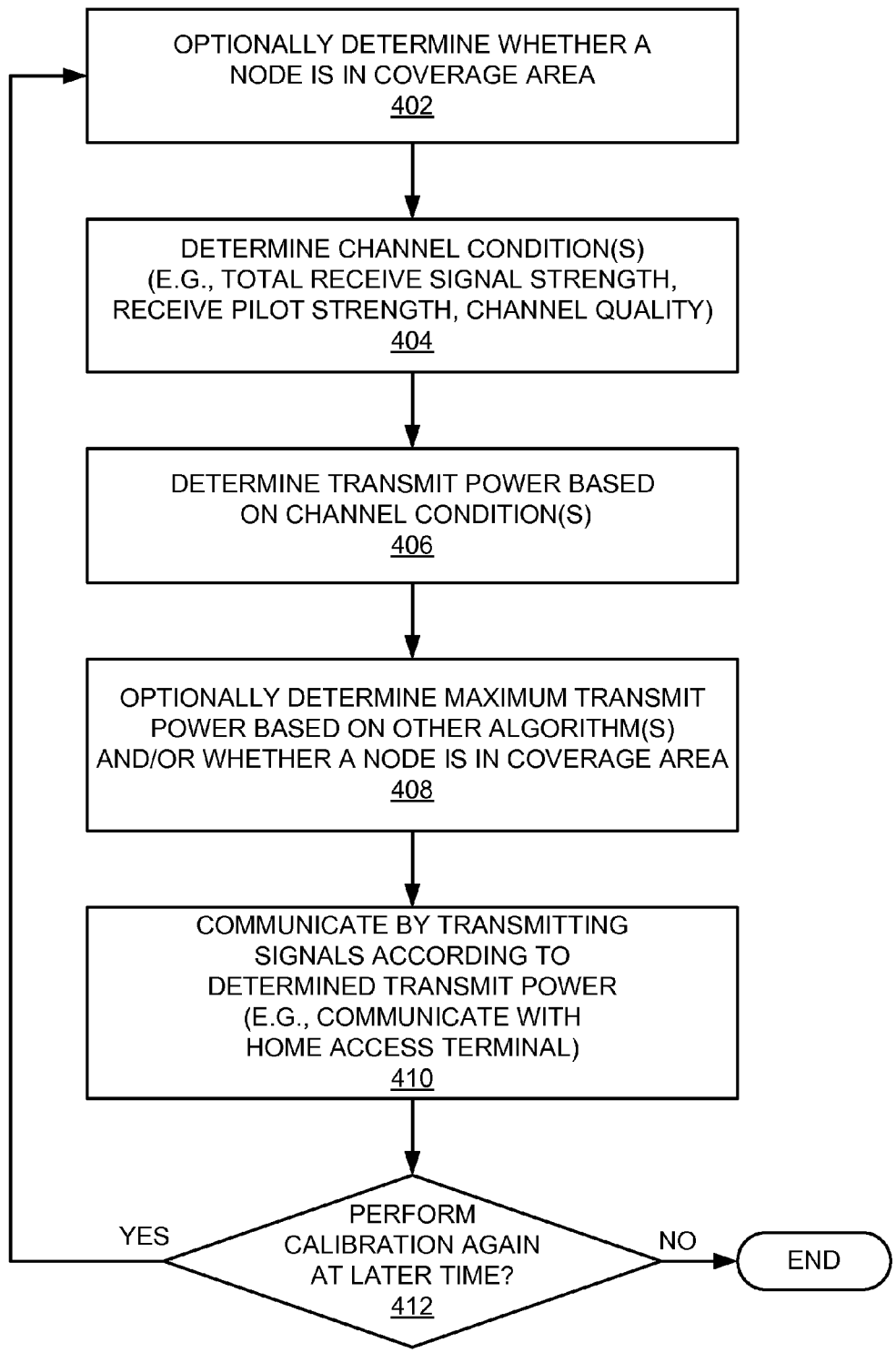
FIG. 4 is a flowchart of several sample aspects of operations that may be performed to determine transmit power based on one or more channel conditions.

Referring now to FIG. 4, the disclosure relates in some aspects to defining transmit power based on one or more channel conditions. As will be discussed in more detail below, examples of such channel conditions may include total received signal strength, receive pilot strength, and channel quality.

As represented by block 402, in some cases determination of transmit power for an access node may be invoked due to or may be based on a determination that a node is in a coverage area of the access node. For example, the femto node 200 may elect to recalibrate the femto's transmit power (e.g., to increase the power) if it determines that a home access terminal (e.g., a node that is authorized for data access) has entered the femto's coverage area. In addition, the femto node 200 may elect to recalibrate its transmit power (e.g., to decrease the power) if it determines that a visitor access terminal (e.g., that is not authorized for data access) has entered its coverage area. To this end, the femto node 200 may include a node detector 224 that may determine whether a particular type of node is in a given coverage area.

As represented by block 404, in the event the femto node 200 elects to calibrate its transmitter (e.g., upon power-up, periodically, or in response a trigger such as block 402), the femto node 200 may determine one or more channel conditions. Such a channel condition may take various forms. For example, in some implementations a signal strength determiner 226 may determine a total received signal strength value (e.g., a received signal strength indication, RSSI). In some implementations a received pilot strength determiner 228 may determine a signal strength value associated with a pilot (e.g., received signal code power, RSCP). Sample techniques relating to these channel conditions are described in more detail below in conjunction with FIGS. 5 and 6.

In some implementations a channel quality determiner 230 may determine a channel quality (e.g., a channel quality indication, CQI). This channel quality may relate to, for example, the quality of a downlink channel at a home access terminal.

Various indications of channel quality may be employed in accordance with the teachings herein. For example, channel quality may relate to a sustainable data rate (e.g., data rate control, DRC), downlink quality of service, signal-to-noise ratio (e.g., SINR where the noise may include or substantially comprise interference), or some other quality metric. Channel quality also may be determined for various types of channels such as, for example, a data channel, a common control channel, an overhead channel, a paging channel, a pilot channel, or a broadcast channel.

The channel quality determiner 230 may determine channel quality in various ways. For example, in some implementations information relating to channel quality may be received from another node (e.g., a home access terminal). This information may take the form of, for example, an actual channel quality indication or information that may be used to generate a channel quality indication.

As represented by block 406, the femto node 200 (e.g., the transmit power controller 208) determines a transmit power value (e.g., a maximum value) based on the channel condition(s). For example, in an implementation where transmit power is based at least in part on a channel quality indication, the transmit power may be increased in response to a decrease in channel quality or if the channel quality falls below a threshold level. Conversely, the transmit power may be decreased in response to an increase in channel quality or if the channel quality rises above a threshold level. As a specific example, if requested DRC over a long time period is always very high, this may serve an indication that the transmit power value may be to high and the femto node 200 may therefore elect to operate at lower transmit power value.

As represented by block 408, the femto node 200 may determine one or more other maximum transmit power values (e.g., based on the algorithms described herein or some other algorithm or criteria). The femto node 200 may thus select the lowest of these determined transmit power values (e.g., TX_PWR_1 ... TX_PWR_N stored in the data memory 212) as the actual "maximum" transmit power value as described above in conjunction with FIG. 3.

In some implementations the femto node 200 (e.g., the transmit power controller 208) may determine (e.g., adjust) the transmit power based on whether there is a node in a coverage area of the femto node 200. For example, as discussed at block 402 transmit power may be decreased in the presence of a visiting access terminal and transmit power may be increased in the presence of a home access terminal.

As represented by block 410, the femto node 200 may communicate with another node or other nodes by transmitting signals constrained according to the determined transmit power. For example, if at some point in time the femto node 200 determines that interference with a visiting access terminal is unlikely, the femto node 200 may increase its transmit power up to the lowest of the maximum values determined at block 408.

As represented by block 412, in some implementations the femto node 200 may repeatedly perform any of the above transmit power calibration operations (e.g., as opposed to simply determining the transmit power a single time upon deployment). For example, the femto node 200 may use a default transmit power value when it is first deployed and may then periodically calibrate the transmit power over time. In this case, the femto node 200 may perform one or more of the operations of FIG. 4 (e.g., acquire or receive signal strength or channel quality information) at some other point(s) in time. In some cases, the transmit power may be adjusted to maintain a desired channel quality over time (e.g., to maintain a minimum DRC value or minimum downlink quality of service value at a home access terminal). In some cases, the operations may be performed on a repeated basis (e.g., daily) so that a femto node may adapt to variations in the environment (e.g., a neighbor apartment unit installs a new femto node). In some cases, such a calibration operation may be adapted to mitigate large and/or rapid changes in transmit power (e.g., through the use of a hysteresis or filtering technique).

Figure 5:
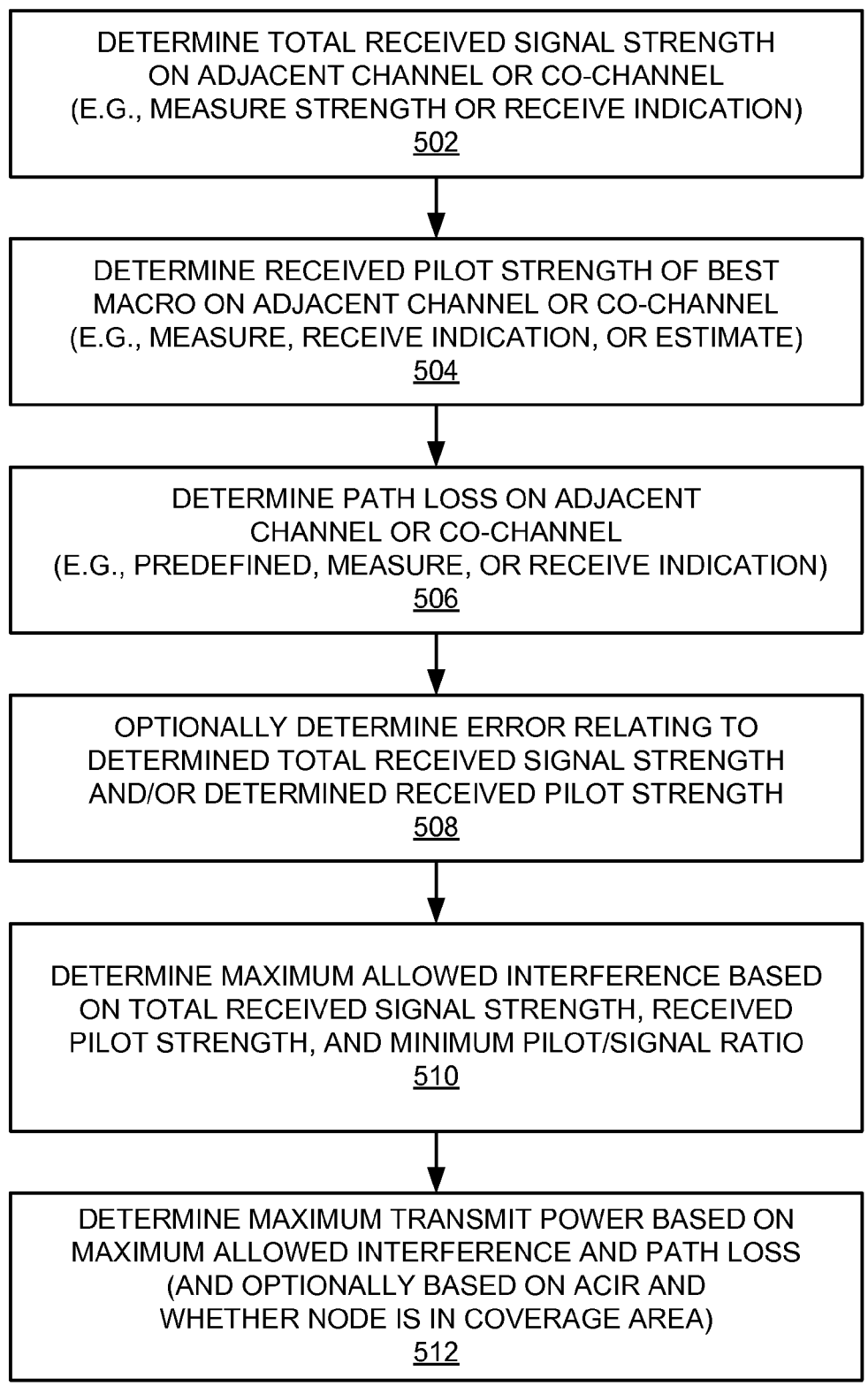
FIG. 5 is a flowchart of several sample aspects of operations that may be performed to determine transmit power based on total received signal strength.

Referring now to FIG. 5, techniques for determining transmit power based on total received signal strength value and received pilot strength as mentioned above will now be treated in more detail. An access node such as a femto node (e.g., femto node 200) operating within a macro cell environment may need to adjust downlink transmit power based on its location within a macro cell. When the femto node is located at the edge of the macro cell, RF leakage outside of the femto node environment (e.g., a residence) may significantly reduce Ec/Io of nearby macro access terminals since the macro signal levels are typically very small in these cell edge locations. As a result, there may be a relative large coverage hole for macro access terminals in the vicinity of the femto node.

If macro access terminals that are not associated with the femto node (e.g., visitor access terminal) enter the coverage region of the femto node, the macro cell network may perform inter-frequency handovers to direct the visitor access terminals to another carrier frequency. Although this technique may reduce the likelihood of call drop or service outage for macro access terminals, it also may result in frequent inter-frequency handoff events for mobile macro access terminals passing through the coverage holes which, in turn, may cause service interruptions and high signaling load on macro cell access nodes. Thus, in some aspects it may be desirable to minimize the size of coverage hole created by the femto node on the macro cell.

On the other hand, if the transmit power level of the femto node is set too low, then proper femto coverage may not be maintained within the femto environment. Moreover, the desired transmit power level may depend on where the femto node is located. For example when a femto node is close to a macro access node, larger transmit power levels may be required to provide adequate femto coverage as compared to when a femto node is located at the edge of a macro cell. Also, different power levels may be specified in urban environments (e.g., where femto nodes may be often be deployed in apartments) than are specified in less dense suburban environments.

The disclosure relates in some aspect to adaptively adjusting the femto node transmit power level through the use of macro cell signal values to limit interference at a visitor access terminal. These operations may be employed to accommodate a visitor access terminal that is operating on an adjacent channel relative to the femto node or on a co-channel with the femto node.

Briefly, the operations of FIG. 5 involve determining the maximum allowed interference that a femto node can create at a visitor access terminal located at an edge of a coverage hole. Here, the maximum allowed interference may be defined as the minimum required Ecp/Io (e.g., received pilot strength over total received signal strength) for reliable macro downlink operation at the visitor access terminal on a given channel. The maximum allowed interference may be derived from the measured received pilot signal strength (Ecp) from the best macro cell on the carrier, the measured total signal strength (Io) on the carrier, and the minimum required Ecp/Io. The maximum transmit power for the femto may then be derived based on the maximum allowed interference and the path loss between the femto node and the edge of the coverage hole (and the adjacent channel interference rejection, if applicable).

For a predetermined downlink transmit power $P_{HNB}$ of a femto node (e.g., home NodeB, HNB) and a corresponding adjacent carrier interference ratio ("ACIR") of, for example, 33 dB at a distance "d" from the femto node, a visitor access terminal (e.g., user equipment, UE) may experience interference from the femto node as high as:

$$Rx_{VUE}(d) = P_{HNB} - ACIR - PL_{FREE}(d) \quad \text{EQUATION 1}$$

where $PL_{FREE}(d)$ is the free path loss between the transmitter and the receiver equipment separated by a distance "d," and that may be calculated with the formula:

$$PL_{FREE}(d) = 20 \log_{10}(4\pi df/c) - G_T - G_R \quad \text{EQUATION 2}$$

where f is the carrier frequency (e.g., f=2 GHz), and $G_T$ and $G_R$ are respective transmitter and receiver antenna gains (e.g., $G_T = G_R = -2$ dB).

To limit the interference on the visitor access terminal, the femto node adjusts the downlink transmit power $P_{HNB}$ by measuring the macro signal strength, as described in further detail below. In some implementations, the femto node measures the following quantities in an adjacent channel (e.g., the algorithm is run separately on multiple adjacent carriers) or a co-channel:

$RSCP_{BEST\_MACRO\_AC}$=A received pilot signal strength value from the best macro cell in the adjacent carrier.

$RSSI_{MACRO\_AC}$=Total interference signal strength value (Io) in the adjacent carrier.

Accordingly, as represented by block 502 in FIG. 5, the femto node 200 of FIG. 2 (e.g., the signal strength determiner 226) determines the total received signal strength (e.g., RSSI) on the visitor access terminal's channel. The signal strength determiner 226 may determine the signal strength in various ways. For example, in some implementations the femto node 200 measures the signal strength (e.g., the receiver 206 monitors the appropriate channel). In some implementations information relating to the signal strength may be received from another node (e.g., a home access terminal). This information may take the form of, for example, an actual signal strength measurement (e.g., from a node that measured the signal strength) or information that may be used to determine a signal strength value.

Also, as represented by block 504, the femto node 200 (e.g., the received pilot strength determiner 228) determines the received pilot strength (e.g., RSCP) of the best macro access node on the visitor access terminal's channel. In other words, the signal strength of the pilot signal having the highest received signal strength is determined at block 504. The received pilot strength determiner 228 may determine the received pilot strength in various ways. For example, in some implementations the femto node 200 measures the pilot strength (e.g., the receiver 206 monitors the appropriate channel). In some implementations information relating to the pilot strength may be received from another node (e.g., a home access terminal). This information may take the form of, for example, an actual pilot strength measurement (e.g., from a node that measured the signal strength) or information that may be used to determine a pilot strength value.

In some implementations, the received pilot strength may be determined (e.g., estimated) from the total received signal strength obtained at block 502. This determination may be based on, for example, a known or estimated relationship between the pilot strength and the total strength that is embodied in the form of information 232 (e.g., a function, a table, or a graph) stored in the data memory 212. In such an implementation, the signal strength determiner 226 may comprise the received signal strength determiner 228.

As represented by block 506, the femto node 200 (e.g., the path/coupling loss determiner 220) determines the path loss between the femto node and a given location (e.g., an edge of a coverage hole or a location of a node) on the visitor access terminal's channel. The path/coupling loss determiner 220 may determine the path loss in various ways. In some cases the path loss may simply be a design parameter that is predefined (e.g., when the femto node 200 is provisioned) such that the path loss value corresponds to a coverage hole of a given size. Thus, determining the path loss may simply involve retrieving a corresponding value 218 from the data memory 212. In some cases, determining path loss may involve the node (e.g., the receiver 206) receiving an indication of the path loss from another node (e.g., an access terminal). In addition, in some cases determining path loss may involve the femto node 200 (e.g., the path/coupling loss determiner 220) calculating the path loss. For example path loss may be determined based on a receive signal strength report received from another node such as a home access terminal. As a specific example, the path loss to an edge of a femto node's coverage boundary may be determined based on the last measurement report (e.g., reporting the strength of a signal received from the femto node) received from a home access terminal before it performs a handoff to another access node. Here, an assumption may be made that the access terminal may be near the boundary since the access terminal is doing a handoff. In some cases, the femto node 200 may determine multiple pass loss values over time and generate a final path loss value based on the collected path loss values (e.g., set the path loss to the maximum value).

As represented by block 508, the femto node 200 (e.g., an error determiner 234) may optionally determine one or more error values relating to the determination of the total received signal strength and/or the received pilot strength. For example, the error determiner 234 may receive total received signal strength and received pilot strength information from a node (e.g., a home access terminal) that measured these values at various locations in or near the coverage area of the femto node 200. The error determiner 234 may then compare these values with corresponding values measured at the femto node 200. Error values may then be determined based on the difference between corresponding sets of these values. In some cases, this operation may involve collecting error information over time, and defining error values based on the collected information (e.g., based on the range of the collected error information). Error information 236 corresponding to the above may be stored in the data memory 212.

As represented by block 510, the femto node 200 (e.g., an interference determiner 238) determines the maximum allowed interference based on the total received signal strength, the received pilot strength, and the minimum required Ecp/Io for a visitor access terminal (e.g., a pilot-to-signal ratio).

In WCDMA and 1xRTT systems, pilot and control channels are code division multiplexed with traffic and are not transmitted at full power (e.g., Ecp/Io<1.0). Thus, when the femto node performs the measurements, if neighboring macro cells are not loaded, the total interference signal strength value $RSSI_{MACRO\_AC}$ may be lower than a corresponding value for a case wherein the neighboring macro cells are loaded. In one example, considering a worst case scenario, the femto node may estimate system loading and adjust the $RSSI_{MACRO\_AC}$ value to predict the value for a fully loaded system.

Ecp/Io (P-CPICH Ec/No in 3GPP terminology) experienced by the visitor access terminal may be calculated as follows:

$$(Ecp/Io)_{LINEAR} = RSCP_{BEST\_MACRO\_AC\_LINEAR} / (RSSI_{MACRO\_AC\_LINEAR} + I_{HNB\_LINEAR}) \quad \text{EQUATION 3}$$

where all the quantities have linear units (instead of dB) and $I_{HNB\_LINEAR}$ corresponds to interference created by the femto node at the visitor access terminal.

If, as an example, a minimum required value for $(Ecp/Io)_{LINEAR}$ to ensure a reliable down link operation is $(Ecp/Io)_{MIN\_LINEAR}$, then the femto node computes a parameter indicative of the maximum allowed interference that it can induce at the visitor access terminal, such that the resultant value at the minimum distance is equal to $(Ecp/Io)_{MIN}$, as follows:

$$I_{HNB\_MAX\_ALLOWED\_LINEAR} = \frac{RSCP_{BEST\_MACRO\_AC\_LINEAR}}{(Ecp/Io)_{MIN\_LINEAR}} - RSSI_{MACRO\_AC\_LINEAR} =$$

$$RSSI_{MACRO\_AC\_LINEAR}\left(\frac{(Ecp/Io)_{MACRO\_AC\_LINEAR}}{(Ecp/Io)_{MIN\_LINEAR}} - 1\right)$$

$$\text{EQUATION 4}$$

As represented by block 512 of FIG. 5, the femto node 200 (e.g., the transmit power controller 208) determines the maximum transmit power based on the allowed interference, the path loss and, optionally, the ACIR for the femto node 200. As mentioned above, the operations of FIG. 5 may be used for limiting the coverage hole on either an adjacent channel or a co-channel. In the former case ACIR may be a predefined value (e.g., dependent on the design parameters of the system). In the latter case, ACIR is 0 dB. An ACIR value 240 may be stored in the data memory 212.

In some aspects, a femto node may thus convert the calculated maximum allowed interference value at an actual or hypothetical visitor access terminal to a corresponding allowed transmit power value, such that at a predetermined minimum distance $I_{HNB\_MAX\_ALLOWED}$ is achieved. For example, if the allowed coverage hole radius around the femto node is $d_{HNB\_AC\_COVERAGE\_HOLE}$, then the corresponding path loss value PL can be calculated with the above formula, i.e., $PL_{FREE\_SPACE}(d_{HNB\_AC\_COVERAGE\_HOLE})$, and:

$$P_{MAX\_HNB} < P_{VUE\_AC\_MAX} = (I_{HNB\_MAX\_ALLOWED} + PL_{FREE\_SPACE}(d_{HNB\_AC\_COVERAGE\_HOLE}) + ACIR) \quad \text{EQUATION 5}$$

The transmit power may thus be defined in a manner that enables operation of a visiting access terminal at a predetermined minimum distance from a femto node (e.g., corresponding to an edge of a coverage hole), without unduly restricting the operation of the femto node's home access terminals. Consequently, it may be possible for both the visiting and home access terminals to operate effectively near the edge of the coverage hole.

With the above in mind, additional considerations relating to scenarios where a macro access terminal (e.g., a visitor access terminal) that is not associated with a femto node is at or near a coverage area of the femto node will now be treated. Here, a femto node (e.g., located near a window) may jam macro access terminals passing by (e.g., on a street) if these macro access terminals are not be able to handoff to the femto node due to a restricted association requirement. The following parameters will be used in the discussion:

$Ecp_{MNB\_UE}$: Received pilot strength (RSCP) from the best macro access node (e.g., MNB) by the macro access terminal (e.g., UE) (in linear units).

$Ecp_{MNB\_HNB}$: Received pilot strength (RSCP) from best macro access node by the femto node (e.g., HNB) (in linear units).

$Ec_{HNB\_UE}$: Total received signal strength (RSSI) from the femto node by the macro access terminal (in linear units). (Also known as $RSSI_{MNB\_UE}$).

$Ec_{HNB\_HNB}$: Total received signal strength (RSSI) from the femto node by the macro access terminal (in linear units). (Also known as $RSSI_{MNB\_HNB}$).

As the macro access terminal gets close to the coverage of the femto node, the desired behavior is for the macro cell to move the access terminal to another carrier as discussed above. In CDMA systems, this trigger is based on the $Ecp_{HNB\_UE}/Io$ value going above a certain T_ADD threshold value. In one example, in 1xEV-DO, the interfrequency handoff trigger would be: $Ecp_{HNB\_UE}/Io > T\_ADD$, where an example value for T_ADD=−7 dB ($T\_ADD_{LINEAR}$=0.2). On the other hand, in WCDMA systems, relative signal strength with respect to the best macro cell is typically used as the trigger. For example, when $Ecp_{HNB\_UE}$ gets within a certain range of $Ecp_{MNB\_UE}$: $Ecp_{MNB\_UE} - Ecp_{HNB\_UE} = \Delta_{HO\_BOUNDARY}$, and $\Delta_{HO\_BOUNDARY}$ may take values around, for example, 4 dB, but the 3GPP standard allows for each individual cell to have a different offset.

In some cases, if the macro access terminal that experiences a certain $Ecp_{MNB\_UE}/Io$ value approaches a femto node which is fully loaded (i.e., 100% transmit power), then one question is whether $Ecp_{MNB\_UE}/Io$ will degrade below a certain minimum threshold (e.g., Ec/Io_min=−16 dB) until it is directed to another carrier. Let $RSSI_{MACRO}$ indicate the total received signal strength (e.g., Io) by the macro access terminal, excluding the interference from the femto node. Then, at the handoff boundary:

$$Ecp_{MNB\_UE}/Io = \frac{Ecp_{MNB\_UE}/RSSI_{MACRO}}{1 + (\alpha \cdot Ecp_{HNB\_UE}/RSSI_{MACRO})} \quad \text{EQUATION 6}$$

where α corresponds to the total femto node transmit power value divided by the pilot power value (i.e., Ior/Ecp). For 1×EV-DO systems, for example:

$$Ecp_{HNB\_UE}/RSSI_{MACRO} = \frac{T\_ADD_{LINEAR}}{(1-T\_ADD_{LINEAR})} \quad \text{EQUATION 7}$$

and for example values T_ADD=−7 dB and α=1:

$$Ecp_{MNB\_UE}/Io\,|_{1xEV-DO} = \frac{Ecp_{MNB\_UE}/RSSI_{MACRO}}{1.25} \quad \text{EQUATION 8}$$

In another example, for WCDMA, assuming $\Delta_{HO\_BOUNDARY}$=4 dB and α=10:

$$Ecp_{MNB\_UE}/Io\,|_{WCDMA} = \frac{Ecp_{MNB\_UE}/RSSI_{MACRO}}{1+4(Ecp_{HNB\_UE}/RSSI_{MACRO})} \quad \text{EQUATION 9}$$

As described above, for an interfrequency handoff-based mechanism, the relative degradation of a macro access terminal at the handoff boundary may be tolerable. Next, the distance of this interfrequency handoff boundary from the edge of the femto node is addressed. In some aspects, if this distance is very large, the utilization of the same carrier by the macro access terminal may be very small (especially if there are a large number of femto cells in a macro cell). In other words, the interfrequency handoff mechanism may work well (independent of the femto node downlink transmit power) and macro access terminals may operate reliably outside femto node handoff boundaries. However, if large femto node transmit power values are used, the handoff boundaries extend towards the macro cell and the regions where co-channel macro access terminals operate effectively may be very limited. In the example described above, it is assumed that the home node may effectively measure Ecp and RSSI values experienced by the visitor access terminal because the visitor access terminal is assumed to be very close to the femto node at a predetermined distance (e.g., a few meters). However, when the macro access terminal is outside the femto residence, $Ecp_{MNB\_UE}$ and $Ecp_{MNB\_HNB}$ may take different values. For example, $Ecp_{MNB\_HNB}$ may experience penetration loss, while $Ecp_{MNB\_UE}$ may not. This may lead to the conclusion that $Ecp_{MNB\_UE}$ is always greater than $Ecp_{MNB\_HNB}$. However, sometimes the femto node residence creates a shadow effect whereby $Ecp_{MNB\_UE}$ is lower than $Ecp_{MNB\_HNB}$ (e.g., the femto node is located between a macro access node and a macro access terminal). In one example, the difference between the femto node best macro Ecp measurement and macro access terminal best macro Ecp measurement at the handoff boundary is:

$$\Delta_{Ecp\_MEAS\_DIFF\_HO\_BOUNDARY} = Ecp_{MNB\_UE} - Ecp_{MNB\_HNB} \quad \text{EQUATION 10}$$

Similarly, the difference between macro RSSI measurements at the femto node and the macro access terminal at the handoff boundary may be calculated as follows:

$$\Delta_{RSSI\_MEAS\_DIFF\_HO\_BOUNDARY} = RSSI_{MNB\_UE} - RSSI_{MNB\_HNB} \quad \text{EQUATION 11}$$

In some aspects, these values may comprise the error information described above at block 508.

Based on prior measurements, a range of values could be applied for $\Delta_{Ecp\_MEAS\_DIFF\_HO\_BOUNDARY}$. Then, in one example, the downlink transmit power ($P_{HNB}$) of the femto node may be decided based on constraints described in detail above (e.g., Equations 4 and 5), wherein, for example, ACIR=0 dB, since, in this case, the access terminal is not on an adjacent channel, but it is on a co-channel with the femto node, and wherein $PL_{FREE\_SPACE}$ ($d_{HNB\_AC\_COVERAGE\_HOLE}$) is replaced by a desired path loss value to the co-channel coverage hole.

In some cases, a femto node may be located next to an external wall or window of a residence. This femto node may create a maximum amount of interference to the macro cell on the outside of the wall/window. If the attenuation due to the wall/window is $PL_{WALL}$ and, in one example, for simplicity $\Delta_{HNB\_MUE\_MEAS\_DIFF}$=0 dB and $\Delta_{RSSI\_MNB\_MUE\_MEAS\_DIFF}$=0 dB, then: $Ecp_{HNB\_UE}(d)$= (Ecp/Ior)$P_{HNB}$−$PL_{FREE}$(d)−$PL_{WALL}$, where the total femto node downlink transmit power ($P_{HNB}$) is decided based on the constraints described above.

One method to reduce the coverage holes created by the femto node is to reduce Ecp/Ior for the femto node. However, it may not be desirable to reduce the femto node Ecp/Ior arbitrarily since this may bring the handoff boundary closer to the femto node and macro access terminal performance may degrade significantly if the femto node is loaded. Moreover, a predetermined minimum Ecp level may be defined for successful operation of access terminals in the femto coverage (e.g., channel estimation, etc.) to allow them to hand in to the femto coverage from macro cell coverage. Thus, in some cases a hybrid method may be implemented such that when there is no active user served by the femto node, Ecp/Ior may be reduced to a reasonably low value, such that, for those periods of time, the coverage hole in the macro cell is limited. In other words, the transmit power may be adjusted based on whether a node is in the vicinity of the femto node as discussed above at block 408.

For a home access terminal, Ecp may be calculated as follows: $Edp_{HUE}=P_{HNB}-Ecp/Ior-PL_{HNB}$, where $PL_{HUE}$ corresponds to the path loss from the femto node to the home access terminal.

In some cases, there is no interference from neighboring access terminals and all interference is coming from the macro cell and the thermal noise floor. One of the important parameters in the above equation is $PL_{HUE}$. A common model used for indoor propagation is:

$$PL_{HNB}(d) = 20\log\left(\frac{4\pi f}{c}\right) + 20\log(d) + \sum_i W_i \quad \text{EQUATION 12}$$

where $W_i$; is the penetration loss through internal walls.

Figure 6:
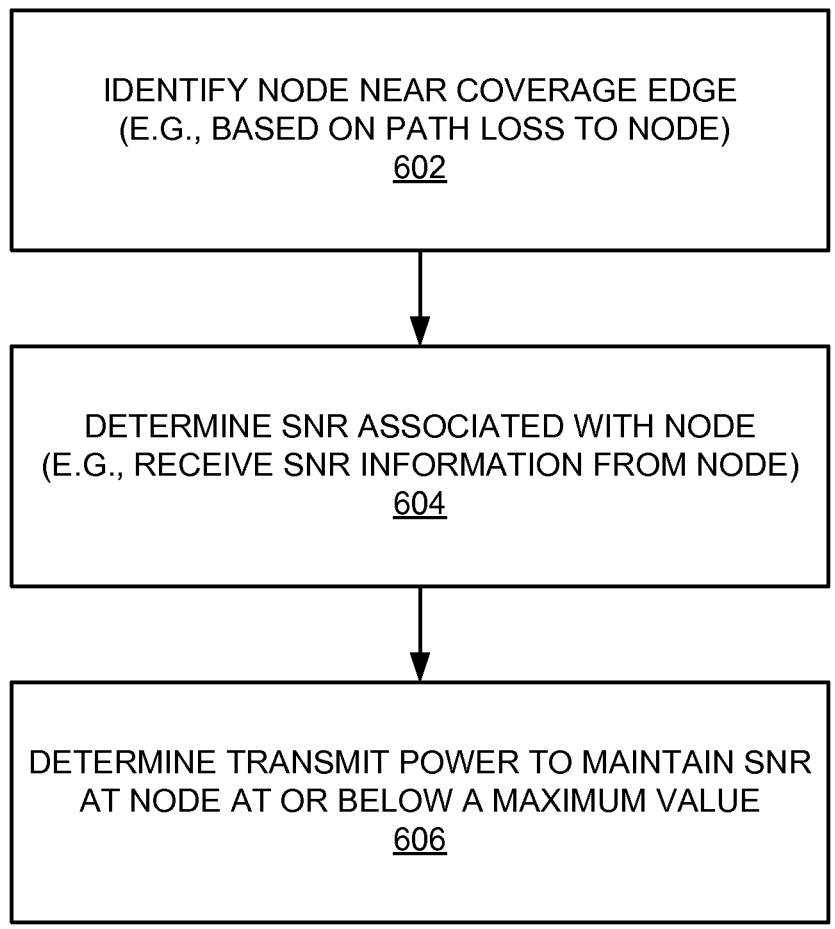
FIG. 6 is a flowchart of several sample aspects of operations that may be performed to determine transmit power based on signal-to-noise ratio.

Referring now to FIG. 6, in some implementations the maximum transmit power defined by the femto node 200 may be constrained based on a signal-to-noise ratio for a home access terminal located around the edge of a coverage hole. For example, if the signal-to-noise ratio is higher than expected at a home access terminal that is located where the coverage hole is expected to end, this means that the coverage hole may in fact be much larger than desired. As a result, undue interference may be imposed on visitor access terminals near the intended coverage edge.

The disclosure relates in some aspects to reducing the transmit power if the signal-to-noise ratio at the home access terminal is higher than expected. The following parameters are used in the discussion that follows:

Io$_{UE}$: Total received signal strength (Io) by the home access terminal (e.g., UE) from all access nodes (e.g., NodeBs) in the absence of the femto node (in linear units).

Io$_{HNB}$: Total received signal strength (Io) by the home access terminal from all other access nodes (e.g., macro and femto access nodes) in the system (in linear units).

PL$_{HNB\_edge}$: Path loss from the femto node (e.g., HNB) to the home access terminal at the coverage edge (in dB units).

When a femto node is not transmitting, received Ecp/Io by a macro access terminal may be:

$$Ecp/Io\,|_{HNB\_not\_transmitting} = \frac{Ecp_{MNB\_UE}}{Io_{UE}} \qquad \text{EQUATION 13}$$

When the femto node is transmitting, received Ecp/Io by the access terminal may be:

$$Ecp/Io\,|_{HNB\_transmitting} = \frac{Ecp_{MNB\_UE}}{Io_{UE} + Ec_{HNB\_UE}} \qquad \text{EQUATION 14}$$

The parameter [Ecp/Io]$_{min}$ is defined as the minimum required Ecp/Io for the macro access terminal to have proper service (e.g., as discussed above at FIG. 5). Assuming the macro access terminal is at the edge of a femto node coverage hole and the coverage hole is limited to a certain value (e.g., PL$_{HNB\_edge}$=80 dB), then one may impose the following condition for the femto node downlink maximum transmit power: P$_{HNB\_max}$ (e.g., to maintain [Ecp/Io]$_{min}$ for a macro access terminal):

$$P_{HNB\_max} < \left[\left(\frac{Ecp_{MNB\_UE}}{[Ecp/Io]_{min}}\right) - Io_{UE}\right] \cdot 10^{(PL_{HNB\_edge}/10)} \qquad \text{EQUATION 15}$$

Similarly, if a home access terminal (e.g., a home UE, HUE) that is serviced by the femto node is located at the edge of the femto coverage, the SNR (the term SINR, e.g., including interference, will be used in the following discussion) experienced by the home access terminal may be described as:

$$SINR_{HUE} = \frac{P_{HNB\_max}}{Io_{UE} \cdot 10^{(PL_{HNB\_edge}/10)}} \qquad \text{EQUATION 16}$$

In some cases Equation 16 may yield to relatively large transmit power levels for the femto node which may result in unnecessarily high SINR$_{HUE}$. This may mean, for example, that if a new femto node is installed in the vicinity of the old femto node, the new femto node may end up receiving a high level of interference from the previously installed femto node. As a result, the newly installed femto node may be confined to a lower transmit power level and may not provide sufficient SINR for its home access terminals. To prevent this type of effect an SINR cap may be used for the home access terminal at the edge of its home access terminal coverage as: [SINR]$_{max\_at\_HNB\_edge}$. Thus, one may provide a second constraint for the P$_{HNB\_max}$ as:

$$P_{HNB\_max} < [SNR]_{max\_at\_HBN\_edge} \cdot Io_{UE} \cdot 10^{(PL_{HNB\_edge}/10)} \qquad \text{EQUATION 17}$$

To apply constraints as described in Equations 15 and 17 one may measure Ecp$_{MNB\_UE}$ and Io$_{UE}$ at the edge of desired HNB coverage (PL$_{HNB\_edge}$).

Since professional installation may not be practical for femto nodes (e.g., due to financial constraints), a femto node may estimate these quantities by its own measurements of the downlink channel. For example, the femto node may make measurements: Ecp$_{MNB\_HNB}$ and Io$_{HNB}$ to estimate Ecp$_{MNB\_UE}$ and Io$_{UE}$ respectively. This scenario is discussed in more detail below in conjunction with Equation 19. Since the femto node location is different than the access terminal location there may be some error in these measurements.

If the femto node uses its own measurements for adaptation of its own transmit power, this error could result in lower or higher transmit power values compared to optimum. As a practical method to prevent worst cases errors, certain upper and lower limits may be enforced on P$_{HNB\_max}$ as P$_{HNB\_max}$ limit and P$_{HNB\_min\_limit}$ (e.g., as discussed above).

In view of the above, referring to block 602 FIG. 6, a transmit power adjustment algorithm may thus involve identifying a home access terminal near a coverage edge of a femto node. In the example of FIG. 2, this operation may be performed by the node detector 224. In some implementations, the position of the home access terminal may be determined based on path loss measurements between the home access terminal and the femto node (e.g., as discussed herein).

At block 604, the femto node 200 (e.g., an SNR determiner 242) may determine SNR values (e.g., SINR) associated with the home access terminal. In some cases, this may involve receiving SNR information from the home access terminal (e.g., in a channel quality report or a measurement report). For example, the home access terminal may send measured RSSI information or calculated SNR information to the femto node 200. In some cases, CQI information provided by the home access terminal may be correlated (e.g., by a known relationship) to an SNR value of the home access terminal. Thus, the femto node 200 may derive SNR from received channel quality information.

As mentioned above, determining an SNR value may involve the femto node 200 autonomously calculating the SNR value as discussed herein. For example, in cases where the femto node 200 performs the measurement operations on its own, the femto node 200 may initially measure:

Ecp$_{MNB\_HNB}$: Total received pilot strength from best macro access node by the femto node.

Io$_{HNB}$: Total received signal strength (Io) by the femto node from all other access nodes (e.g., macro and femto nodes) in the system.

The femto node 200 may then determine upper power limits:

$$P_{HNB\_max\_1} = \left[\left(\frac{Ecp_{MNB\_HNB}}{[Ecp/Io]_{min}}\right) - Io_{HNB}\right] \cdot 10^{(PL_{HNB\_edge}/10)} \qquad \text{EQUATION 18}$$

$$P_{HNB\_max\_2} = \qquad \text{EQUATION 19}$$
$$[SINR]_{max\_at\_HNB\_edge} \cdot Io_{HNB} \cdot 10^{(PL_{HNB\_edge}/10)}$$

Here, Equation 18 relates to the maximum transmit power determined in a similar manner as discussed in FIG. 5 and Equation 19 relates to determining another maximum limit for the transmit power based on SNR. It may be observed that Equation 18 is similar to Equation 17 except that Io is measured at the femto node. Thus, Equation 18 also provides the constraint that the SNR at the node not be greater than or equal to a defined maximum value (e.g., a SNR value 244 stored in data memory 212). In both of these equations, the determined transmit power is based on signals received at the femto node and on the path loss to the coverage edge (e.g., based on the distance to the edge).

At block 606 of FIG. 6, the femto node 200 (e.g., the transmit power controller 208) may determine the transmit power based on the maximums defined by Equations 18 and 19. In addition, as mentioned above the final maximum power value may be constrained by absolute minimum and maximum values:

$$P_{HNB\_total} = \max \; [P_{HNB\_min\_limit}, \min(P_{HNB\_max1}, P_{HNB\_max2}, P_{HNB\_max\_limit})] \qquad \text{EQUATION 20}$$

As an example of Equation 20, $PL_{HNB\_edge}$ may be specified to be 80 dB, $P_{HNB\_max\_limit}$ may be specified to be 20 dBm, $P_{HNB\_min\_limit}$ may be specified to be −10 dBm, and $[SINR]_{max\_at\_HNB\_edge}$ and $[Ecp/Io]_{min}$ may depend on the particular air interface technology in use.

Figure 7:
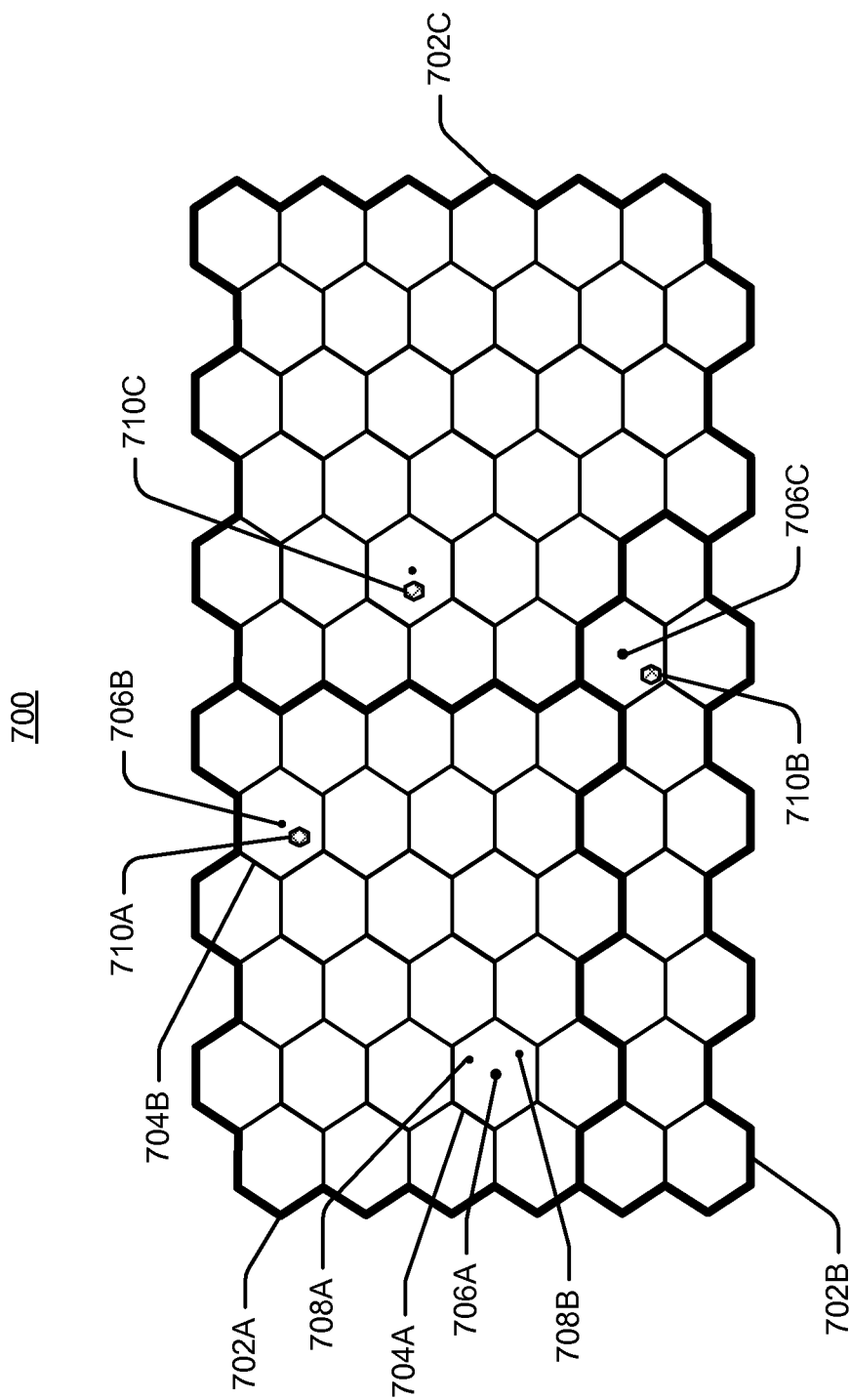
FIG. 7 is a simplified diagram illustrating coverage areas for wireless communication.

As mentioned above, the teachings herein may be implemented in a wireless network that includes macro coverage areas and femto coverage areas. FIG. 7 illustrates an example of a coverage map 700 for a network where several tracking areas 702 (or routing areas or location areas) are defined. Specifically, areas of coverage associated with tracking areas 702A, 702B, and 702C are delineated by the wide lines in FIG. 7.

The system provides wireless communication via multiple cells 704 (represented by the hexagons), such as, for example, macro cells 704A and 704B, with each cell being serviced by a corresponding access node 706 (e.g., access nodes 706A-706C). As shown in FIG. 7, access terminals 708 (e.g., access terminals 708A and 708B) may be dispersed at various locations throughout the network at a given point in time. Each access terminal 708 may communicate with one or more access nodes 706 on a forward link ("FL") and/or a reverse link ("RL") at a given moment, depending upon whether the access terminal 708 is active and whether it is in soft handoff, for example. The network may provide service over a large geographic region. For example, the macro cells 704 may cover several blocks in a neighborhood. To reduce the complexity of FIG. 7, only a few access nodes, access terminals, and femto nodes are shown.

The tracking areas 702 also include femto coverage areas 710. In this example, each of the femto coverage areas 710 (e.g., femto coverage area 710A) is depicted within a macro coverage area 704 (e.g., macro coverage area 704B). It should be appreciated, however, that a femto coverage area 710 may not lie entirely within a macro coverage area 704. In practice, a large number of femto coverage areas 710 may be defined with a given tracking area 702 or macro coverage area 704. Also, one or more pico coverage areas (not shown) may be defined within a given tracking area 702 or macro coverage area 704. To reduce the complexity of FIG. 7, only a few access nodes 706, access terminals 708, and femto nodes 710 are shown.

Figure 8:
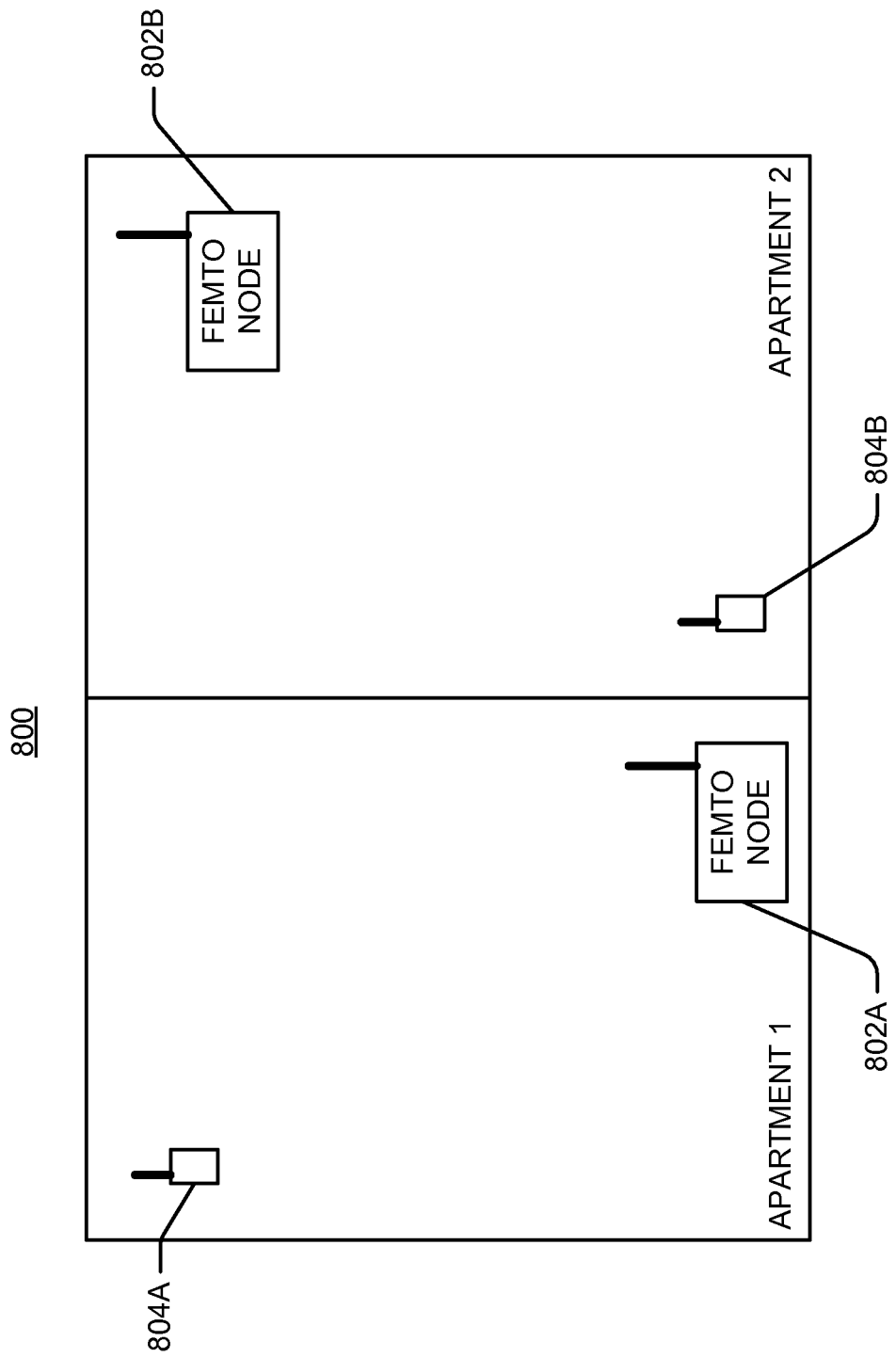
FIG. 8 is a simplified diagram of several sample aspects of a communication system including neighboring femto cells.

FIG. 8 illustrates a network 800 where femto nodes 802 are deployed in an apartment building. Specifically, a femto node 802A is deployed in apartment 1 and a femto node 802B is deployed in apartment 2 in this example. The femto node 802A is the home femto for an access terminal 804A. The femto node 802B is the home femto for an access terminal 804B.

As illustrated in FIG. 8, for the case where the femto nodes 802A and 802B are restricted, each access terminal 804 may only be served by its associated (e.g., home) femto node 802. In some cases, however, restricted association may result in negative geometry situations and outages of femto nodes. For example, in FIG. 8 the femto node 802A is closer to the access terminal 804B than the femto node 802B and may therefore provide a stronger signal at the access terminal 804B. As a result, the femto node 802A may unduly interfere with reception at the access terminal 804B. Such a situation may thus affect the coverage radius around the femto node 802B at which an associated access terminal 804 may initially acquire the system and remain connected to the system.

Referring now to FIGS. 9-13B, the disclosure relates in some aspects to adaptively adjusting transmit power (e.g., maximum downlink transmit power) of neighboring access nodes to mitigate scenarios of negative geometries. For example, as mentioned above maximum transmit power may be defined for overhead channels that are then transmitted as their default fraction of the maximum access node transmit power. For illustration purposes, the following describes a scenario where transmit power of a femto node is controlled based on a measurement report generated by an access terminal associated with a neighboring femto node. It should be appreciated, however, that the teachings herein may be applied to other types of nodes.

Transmit power control as taught herein may be implemented through a distributed power control scheme implemented at the femto nodes and/or through the use of a centralized power controller. In the former case, adjustments of transmit power may be accomplished through the use of signaling between neighboring femto nodes (e.g., femto nodes associated with the same operator). Such signaling may be accomplished, for example, through the use of upper layer signaling (e.g., via the backhaul) or appropriate radio components. In the latter case mentioned above, adjustments to transmit power of a given femto node may be accomplished via signaling between femto nodes and a centralized power controller.

The femto nodes and/or the centralized power controller may utilize measurements reported by access terminals and evaluate one or more coverage criteria to determine whether to send a request to a femto node to reduce transmit power. A femto node that receives such a request may respond by lowering its transmit power if it is able to maintain its coverage radius and if its associated access terminals would remain in good geometry conditions.

Figure 9:
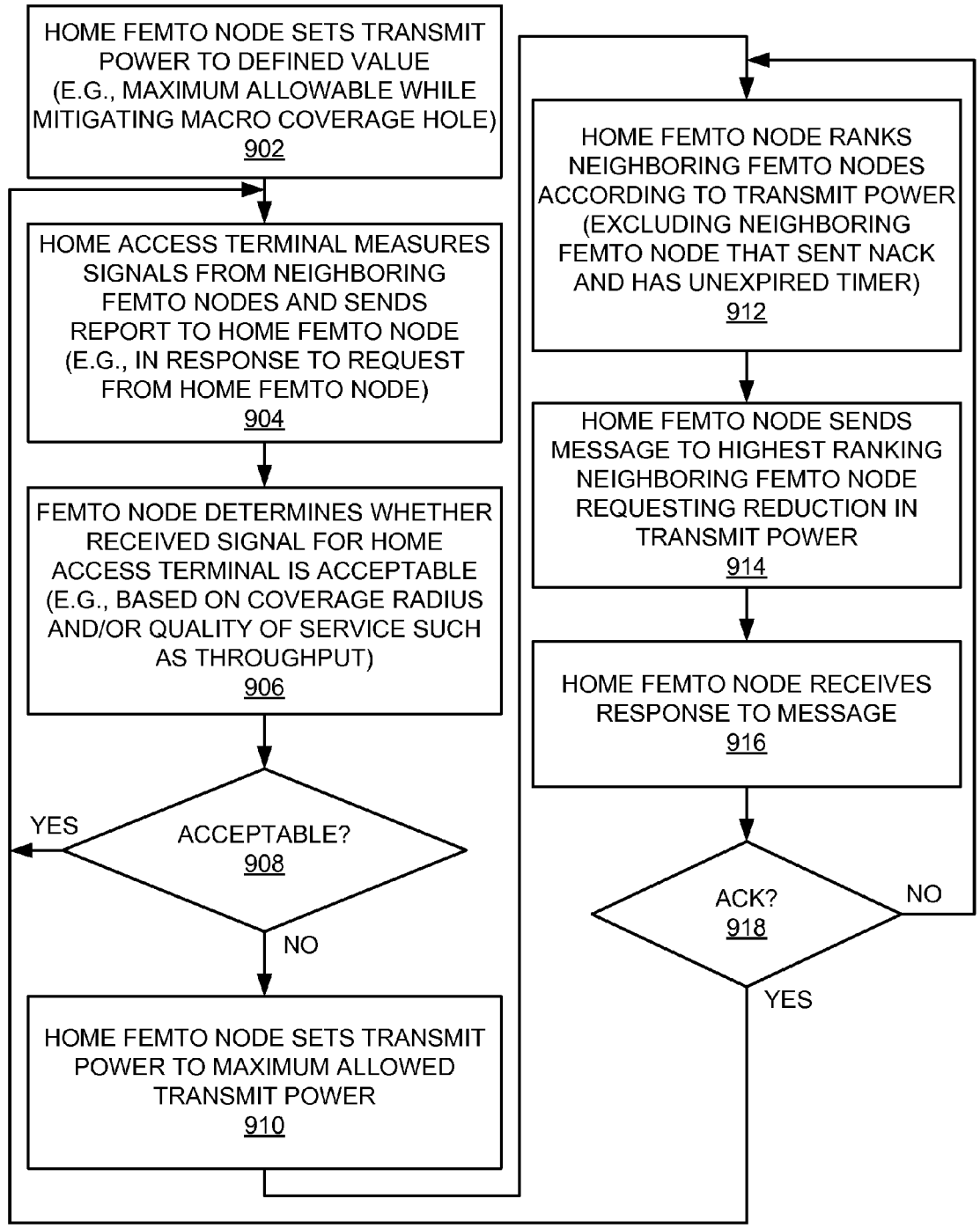
FIG. 9 is a flowchart of several sample aspects of operations that may be performed to control transmit power of a neighboring access node.

FIG. 9 describes several operations relating to an implementation where neighboring femto nodes may cooperate to control one another's transmit power. Here, various criteria may be employed to determine whether transmit power of a neighbor node should be adjusted. For example, in some aspects a power control algorithm may attempt to maintain a particular coverage radius around the femto node (e.g., a certain CPICH Ecp/Io is maintained a certain path loss away from the femto node). In some aspects a power control algorithm may attempt to maintain a certain quality of service (e.g., throughput) at an access terminal. Initially, the operations of FIGS. 9 and 10 will be described in the context of the former algorithm. The operations of FIGS. 9 and 10 will then be described in more detail in the context of the latter algorithm as well.

As represented by block 902 of FIG. 9, a given femto node initially set its transmit power to defined value. For example, all of the femto nodes in the system may initially set their respective transmit power to the maximum transmit power that still mitigates the introduction of coverage holes in a macro coverage area. As a specific example, the transmit power for a femto node may be set so that the CPICH Ecp/Io of a macro access terminal at a certain path loss away (e.g. 80 dB) from the femto node is above a certain threshold (e.g. −18 dB). In some implementations, the femto nodes may employ one or more of the algorithms described above in conjunction with FIGS. 2-6 to establish a maximum transmit power value.

As represented by block 904, each access terminal in the network (e.g., each access terminal associated with a femto node) may measure the signal strength of signals that it receives in its operating band. Each access terminal may then generate a neighbor report including, for example, the CPICH RSCP (pilot strength) of its femto node, the CPICH RSCP of all femto nodes in its neighbor list, and the RSSI of the operating band.

In some aspects, each access terminal may perform this operation in response to a request from its home femto node. For example, a given femto node may maintain a list of neighboring femto nodes that it sends to its home access terminals. This neighbor list may be supplied to the femto node by an upper layer process or the femto node may populate the list on its own by monitoring downlink traffic (provided the femto node includes appropriate circuitry to do so). The femto node may repeatedly (e.g., periodically) send a request to its home access terminals for the neighbor report.

As represented by blocks 906 and 908, the femto node (e.g., the transmit power controller 208 of FIG. 2) determines whether signal reception at each of its home access terminals is acceptable. For example, for an implementation that seeks to maintain a particular coverage radius, a given femto node "i" (e.g., home Node B, "HNB") may estimate the CPICH Ecp/Io_i of a given associated access terminal "i" (e.g., home user equipment, "HUE") assuming the access terminal "i" is a certain path loss (PL) away from the femto node "i" (e.g., assuming the location measured by the femto node "i" will not change much). Here Ecp/Io_i for the access terminal "i" is $$Ecp/Io\_i = \frac{Ecp_{HNB\_HUE\_i}}{Io_{HUE\_i}}.$$

In some implementations, a femto node (e.g., the signal strength determiner 226) may determine RSSI on behalf of its home access terminals. For example, the femto node may determine RSSI for an access terminal based on the RSCP values reported by an access terminal. In such a case, the access terminal need not send an RSSI value in the neighbor report. In some implementations, a femto node may determine (e.g., estimate) RSSI and/or RSCP on behalf of its home access terminals. For example, the signal strength determiner 226 may measure RSSI at the femto node and the received pilot strength determiner 228 may measure RSCP at the femto node.

The femto node "i" may determine whether Ecp/Io_i is less than or equal to a threshold to determine whether coverage for the access terminal "i" is acceptable. If coverage is acceptable, the operational flow may return back to block 904 where the femto node "i" waits to receive the next neighbor report. In this way, the femto node may repeatedly monitor conditions at its home access terminals over time.

If coverage is not acceptable at block 908, the femto node "i" may commence operations to adjust the transmit power of one or more neighboring femto nodes. Initially, as represented by block 910, the femto node "i" may set its transmit power to the maximum allowed value (e.g., the maximum value discussed at block 902). Here, the transmit power of the femto node "i" may have been reduced after it was set the maximum value at block 902, for example, if the femto node "i" had obeyed an intervening request from a neighboring femto node to reduce its transmit power. In some implementations, after increasing the transmit power, the femto node "i" may determine whether the coverage for the access terminal "i" is now acceptable. If so, the operational flow may return back to block 904 as discussed above. If not, the operational flow may proceed to block 912 as discussed below. In some implementations the femto node "i" may perform the following operations without checking the effect of block 910.

As represented by block 912, the femto node "i" (e.g., the transmit power controller 208) may rank the femto nodes in the neighbor report by the strength of their corresponding RSCPs as measured by the access terminal. A ranked list of the potentially interfering nodes 246 may then be stored in the data memory 212. As will be discussed below, the operational block 912 may exclude any neighboring femto node that has sent a NACK in response to a request to reduce transmit power and where a timer associated with that NACK has not yet expired.

As represented by block 914, the femto node "i" (e.g., the transmit power controller 208) selects the strongest interfering neighboring femto node (e.g., femto node "j") and determines by how much that femto node should reduce its transmit power to maintain a given Ecp/Io for access terminal "i" at the designated coverage radius (path loss). In some aspects the amount (e.g., percentage) of power reduction may be represented by a parameter alpha_p. In some aspects, the operations of block 914 may involve determining whether Ecp/Io_i is greater than or equal to a threshold as discussed above.

Next, the femto node "i" (e.g., the transmitter 204 and the communication controller 210) sends a message to the femto node "j" requesting it to lower its power by the designated amount (e.g., alpha_p). Sample operations that the femto node "j" may perform upon receipt of such request are described below in conjunction with FIG. 10.

As represented by block 916, the femto node "i" (e.g., the receiver 206 and the communication controller 210) will receive a message from the femto node "j" in response to the request of block 914. In the event the femto node "j" elected to reduce its transmit power by the requested amount, the femto node "j" will respond to the request with an acknowledgment (ACK). In this case, the operational flow may return to block 904 as described above.

In the event the femto node "j" elected to not reduce its transmit power by the requested amount, the femto node "j" will respond to the request with a negative acknowledgment (NACK). In its response, the femto node "j" may indicate that it did not reduce its power at all or that it reduced its power by a given amount less than the requested amount. In this case, the operational flow may return to block 912 where the femto node "i" may re-rank the femto nodes in the neighbor report according to the RSCP measured by the access terminal "i" (e.g., based on a newly received neighbor report). Here, however, the femto node "j" will be excluded from this ranking as long as the timer associated with its NACK has not expired. The operations of blocks 912 through 918 may thus be repeated until the femto node "i" determines that the Ecp/Io for the access terminal "i" is at the target value or has improved as much as possible.

Figure 10:
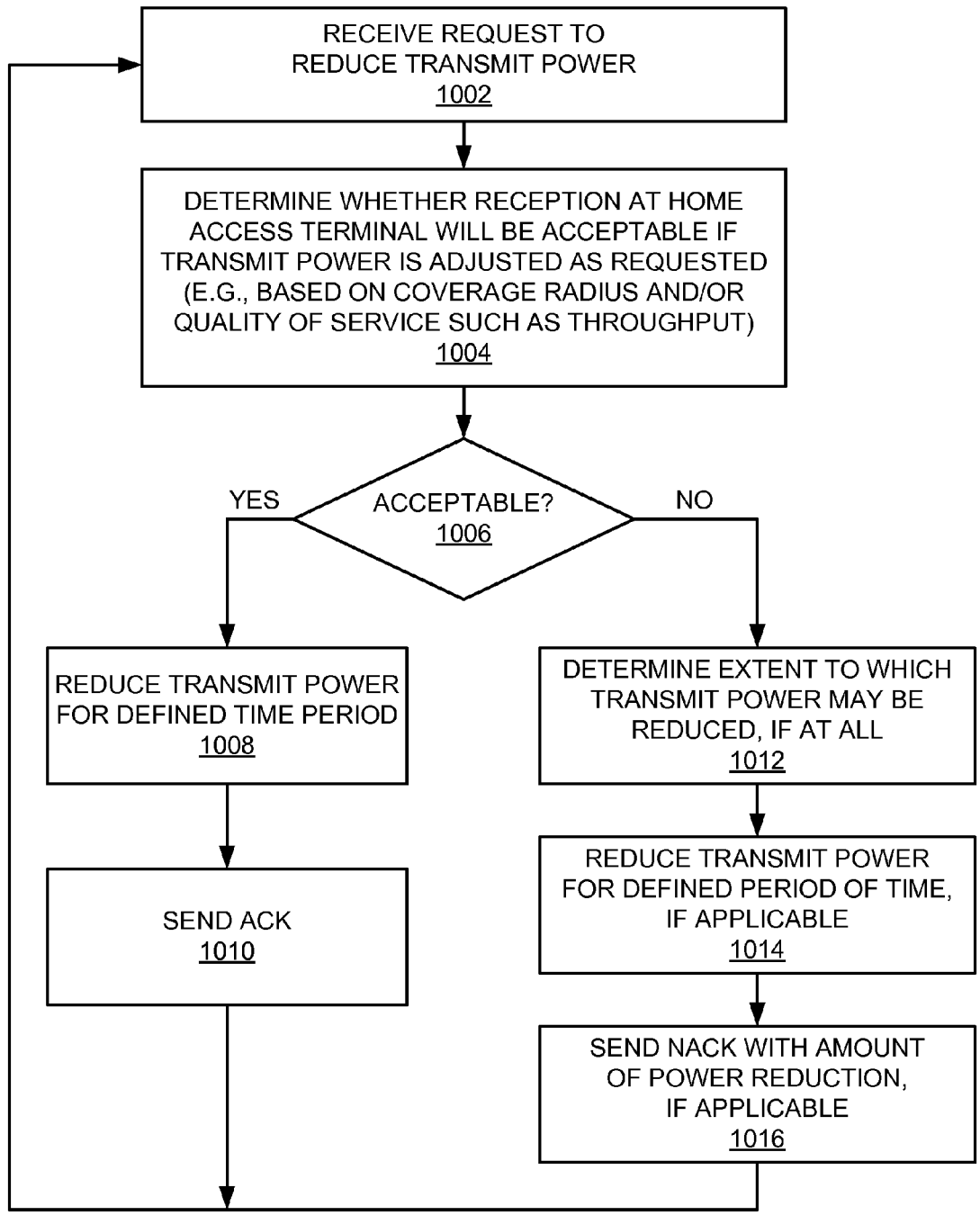
FIG. 10 is a flowchart of several sample aspects of operations that may be performed to adjust transmit power in response to a request from another node.

FIG. 10 illustrates sample operations that may be performed by a femto node that receives a request to reduce transmit power. The receipt of such a request is represented by block 1002. In an implementation where the node 200 of FIG. 2 is also capable of performing these operations, the operations of block 1002 may be performed at least in part by the receiver 206 and the communication controller 210, the operations of blocks 1004-1008 and 1012-1014 may be performed at least in part by the transmit power controller 208, and the operations of blocks 1010 may be performed at least in part by the transmitter 204 and the communication controller 210.

At blocks 1004 and 1006, the femto node determines whether coverage for one or more home access terminals will be acceptable if the transmit power is adjusted as requested. For example, the femto node "j" may evaluate a request to lower its transmit power to alpha_p*HNB_Tx_j by determining whether each of its access terminals may pass a test similar to the test of described at block 906. Here, the femto node "j" may determine whether the Ecp/Io of an associated access terminal at a designated coverage radius is greater than or equal to a threshold value.

If coverage is acceptable at block 1006, the femto node "j" reduces its transmit power by the requested amount for a defined period of time (block 1008). At block 1010, the femto node "j" responds to the request with an ACK. The operational flow may then return to block 1002 whereby the femto node processes any additional requests to reduce transmit power as they are received.

If coverage is not acceptable at block 1006, the femto node "j" determines how much it may lower its transmit power such that the test of block 1004 passes (block 1012). Here, it should be appreciated that in some cases the femto node "j" may elect to not reduce its transmit power at all.

At block 1014, the femto node "j" reduces its transmit power by the amount determined at block 1012, if applicable, for a defined period of time. This amount may be represented by, for example, the value beta_p*HNB_Tx_j.

At block 1016, the femto node "j" will then respond to the request with a negative acknowledgment (NACK). In its response, the femto node "j" may indicate that it did not reduce its power at all or that it reduced its power by a given amount (e.g., beta_p*HNB_Tx_j). The operational flow may then return to block 1002 as described above.

In some implementations, the femto node "i" and the femto node "j" maintain respective timers that count for a defined period time in conjunction with an ACK or a NACK. Here, after its timer expires, the femto node "j" may reset its transmit power back to the previous level. In this way, the femto node "j" may avoid being penalized in the event the femto node "i" has moved.

Also, in some cases each femto node in the network may store the measurements (e.g., the neighbor reports) that it received from an access terminal the last time the access terminal connected with the femto node. In this way, in the event no access terminals are currently connected to the femto node, the femto node may calculate a minimum transmit power to ensure Ecp/Io coverage for initial acquisition.

If the femto node has sent requests to all neighboring femto nodes to reduce their power and cannot yet maintain the desired coverage at the specified coverage radius, the femto node may calculate how much its common pilot Ec/Ior needs to be increased above its default level to reach the target coverage. The femto node may then raise the fraction of its pilot power accordingly (e.g., within a preset maximum value).

An implementation that utilizes a scheme such as the one described above to maintain a coverage radius may thus be used to effectively set transmit power values in a network. For example, such a scheme may set a lower bound on the geometry (and throughput) an access terminal will have if it is within the designated coverage radius. Moreover, such a scheme may result in power profiles being more static whereby a power profile may only change when a femto node is added to or removed from the network. In some implementations, to eliminate further CPICH outage the above scheme may be modified such that the CPICH Ec/Ior is adapted according to measurements collected at the femto node.

A given femto node may perform the operations of blocks 904-918 for all of its associated access terminals. If more than one access terminal is associated with a femto node, the femto node may send a request to an interfering femto node whenever any one of its associated access terminals is being interfered with.

Similarly when evaluating whether or not to respond to a request to reduce transmit power, a femto node performs the test of block 1004 for all its associated access terminals. The femto node may then select the minimum power that will guarantee an acceptable performance to all its associated access terminals.

In addition, each femto node in the network may perform these operations for its respective access terminals. Hence, each node in the network may send a request to a neighboring node to reduce transmit power or may receive a request from a neighboring node to reduce transmit power. The femto nodes may perform these operations in an asynchronous manner with respect to one another.

As mentioned above, in some implementations a quality of service criterion (e.g., throughput) may be employed to determine whether to reduce transmit power of a femto node. Such a scheme may be employed in addition to or instead of the above scheme.

In a similar manner as discussed above, RSCP_i_j is defined as the CPICH RSCP of femto node "j" (HNB_j) as measured by access terminal "i" (HUE_i). RSSI_i is the RSSI as measured by access terminal "i." Ecp/Io_i and Ecp/Nt_i, respectively, are the CPICH Ecp/Io and the CPICH SINR (signal to interference and noise ratio) of access terminal "i" from its associated femto node "i" (HNB_i). The femto node calculates the following:

$$(Ecp/\text{Io}\_i) = \frac{RSCP\_i}{RSSI\_i} \qquad \text{EQUATION 21}$$

$$SINR\_i = \frac{RSCP\_i}{RSSI\_i - RSCP\_i/(Ecp/Ior)} \qquad \text{EQUATION 22}$$

where Ecp/Ior is the ratio of the CPICH pilot transmit power to the total power of the cell.

The femto node estimates the Ecp/Io of the home access terminal if it were at the edge of the femto node coverage corresponding to a path loss of $PL_{HNB\_coverage}$:

$$(Ecp/\text{Io}\_i)_{HNB\_Coverage} = \frac{RSCP\_i\_i_{HNB\_Coverage}}{RSSI\_i} \qquad \text{EQUATION 23}$$

where $RSCP\_i\_i_{HNB\_Coverage}$ is the received pilot strength at access terminal "i" from its own femto node "i" at the edge of the femto node "i" coverage. The edge of coverage corresponds to a path loss (PL) from the femto node equal $PL_{HNB}$ Coverage and $$RSCP\_i\_i_{HNB\_Coverage} = HNB\_Tx\_i*(Ecp/Ior)/PL_{HNB\_Coverage} \quad \text{EQUATION 24}$$

Let (Ecp/Io)_Trgt_A be a threshold on the CPICH Ecp/Io preconfigured in the femto node. The femto node checks the following:

$$(Ecp/Io\_i)_{HNB\_Coverage} > (Ecp/Io)\_Trgt\_A? \quad \text{EQUATION 25}$$

If the answer is YES, the femto node does not send a request to reduce transmit power. If the answer is NO, the femto node sends a request to reduce transmit power as described below. In addition, or alternatively, the femto node may perform a similar test relating to throughput (e.g., SINR_i).

The femto node sets its power to the maximum allowed by the macro cell coverage hole condition.

The femto node "i" ranks the neighbor cells in descending order of the home access terminal's reported RSCP.

The femto node "i" picks the neighbor cell femto node "j" with the highest RSCP value, RSCP_i_j.

The serving femto node "i" calculates how much femto node "j" needs to lower its transmit power such that the performance of its access terminal "i" improves. Let (Ecp/Io)_Trgt_A be a target CPICH Ecp/Io for the home access terminal that is preconfigured in the femto node. This target Ecp/Io can be chosen such that home access terminals are not in outage. It can also be more aggressive to guarantee a minimum geometry of the home access terminals to maintain a certain data throughput or performance criteria. The desired RSCP_i_j_trgt seen by access terminal "i" from neighbor femto node "j" to maintain (Ecp/Io) Trgt_A may be calculated as:

$$RSCP\_i\_j\_Trgt = \frac{(Ecp/Ior) * RSCP\_i\_i_{HNB\_Coverage}}{(Ecp/Io)\_Trgt\_A} - \\ (Ecp/Ior) * RSSI\_i + RSCP\_i\_j \quad \text{EQUATION 26}$$

In addition, or alternatively, the femto node may perform a similar test relating to throughput. The femto node "i" calculates the ratio alpha_p_j by which femto node "j" should lower its power as:

$$alpha\_p\_j = RSCP\_i\_j\_Trgt/RSCP\_i\_j \quad \text{EQUATION 27}$$

The femto node "i" sends a request to femto node "j" to lower its transmit power by a ratio alpha_p_j. As discussed herein this request may be sent through upper layer signaling (backhaul) to a centralized algorithm or sent to femto node "j" directly from femto node "i."

The femto node "j" evaluates whether it may respond to the request of femto node "i" by making its transmit power HNB_Tx_new_j=alpha_p_j*HNB_Tx_j, where HNB_Tx_j is set as above. In some implementations the femto node "j" checks two tests.

Test 1: This test is based on the scheme previously described for FIG. 9. The CPICH Ecp/Io of an associated home access terminal, which is away from the femto node "j" by the coverage radius, is above a certain threshold (Ecp/Io)_Trgt_B. This test is to guarantee that its own UE have an acceptable performance within a certain radius around the femto node and another registered home access terminal can also acquire the femto node. This is calculated as follows:

$$(Ecp/Io\_j)_{HNB\_Coverage} = \frac{RSCP\_j\_j_{HNB\_Coverage}}{RSSI\_j} \quad \text{EQUATION 28}$$

where RSSI_j and RSCP_j_j are the RSSI and RSCP reported by HUE_j at the coverage radius (or otherwise estimated by HNB_j) to femto node "j" before transmit power modification. The test is $$(Ecp/Io\_j)_{HNB\_Coverage} > (Ecp/Io)\_Trgt\_B? \quad \text{EQUATION 29}$$

Test 2: The CPICH SINR of HUE_j is greater than a certain target to maintain a certain performance criterion (e.g., quality of service such as throughput):

$$SINR\_new\_j > SINR\_Trgt? \quad \text{EQUATION 30}$$

where $$SINR\_new\_j = \frac{alpha\_p\_j * RSCP\_j\_j}{RSSI\_j - RSCP\_j\_j/(Ecp/Ior)} \quad \text{EQUATION 31}$$

If either or both tests pass (depending on the particular implementation), femto node "j" lowers its transmit power to be alpha_p_j*HNB_Tx_j and sends an ACK to femto node "i", given that the new power is above the minimum allowed (e.g. −20 dBm).

If one or both tests fail, femto node "j" does not lower its transmit power to the required value. Instead, it calculates how much it can lower its transmit power without hurting its performance. In other words, in an implementation that uses both tests, the femto node may calculate its new transmit powers such that both Test 1 and Test 2 pass and lowers its transmit power to the higher of the two. However, if with the current femto node "j" power settings either test fails, then femto node "j" does not lower its power. The femto nodes may also lower their power to a minimum standardized limit (e.g., as discussed herein). In all these cases, femto node "j" may report a NACK to femto node "i" with its final power settings.

The algorithms discussed above allow femto nodes to adaptively adjust their transmit powers in a collaborative fashion. These algorithm have many parameters which can be adjusted (e.g., by an operator) such as, for example, Ecp/Io_Trgt_A, Coverage_radius, Ecp/Io_Trgt_B, SINR_Trgt, and the timers. The algorithms may be further refined by making the thresholds adapted by a learning process.

In some aspects, the timers may be varied (e.g., independently) to optimize system performance. If an access terminal "i" is not connected to a femto node "i," and femto node "j" is already transmitting to access terminal "j," access terminal "i" may not be able to acquire femto node "i" due to its low CPICH Ecp/Io. The above algorithm may then be modified such that each femto node tries to maintain a minimum CPICH Ecp/Io within a certain radius around the femto node. A disadvantage of this is that neighbor access terminal "j" may be penalized while femto node "i" has no access terminal associated with it. To avoid continuously penalizing neighbor femto nodes, femto node "i" will send in its request to neighbor femto node "j" an indication that this request is for initial acquisition. If femto node "j" responds by lowering its power, it sets a timer and femto node "i" sets a larger timer. The femto node "j" will reset its transmit power to its default value after its timer expires but femto node "i" will not send another request (for initial acquisition) to femto node "j" until the timer for femto node "i" expires. An issue remains in that femto node "i" may have to estimate the RSSI_i as there is not an access terminal associated with it. The femto node "i" also may have to estimate the neighboring interferers RSCP_j. However, the strongest interferers the femto nodes see are not necessarily the strongest interferers its access terminals will see.

To alleviate the initial acquisition problem, access terminals may also be allowed to camp in idle mode on neighboring femto nodes with the same PLMN_ID. The access terminals may read the neighbor list on the camped femto node which may contain the scrambling code and timing of its own femto node. This can put the access terminal at an advantage when acquiring its femto node at negative geometries.

Figure 11:
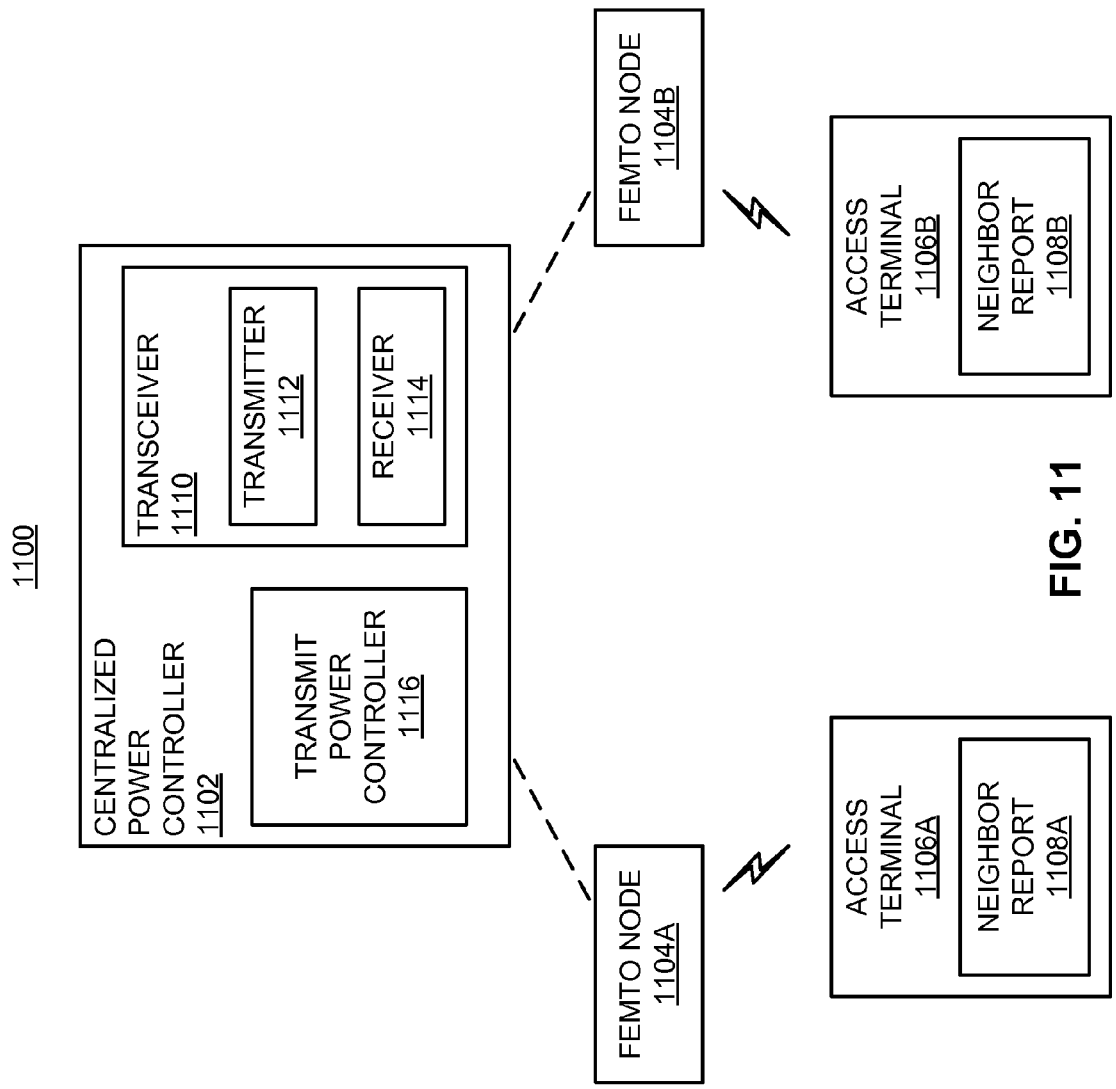
FIG. 11 is a simplified diagram of several sample aspects of a communication system including centralized power control.

Referring now to FIGS. 11-13B, implementations that employ a centralized power controller to control the transmit power of femto nodes are described. FIG. 11 illustrates a sample system 1100 including a centralized controller 1102, femto nodes 1104, and access terminals 1106. Here, femto node 1104A is associated with access terminal 1106A and femto node 1104B is associated with access terminal 1106B. The centralized power controller 1102 includes a transceiver 1110 (with transmitter 1112 and receiver 1114 components) as well as a transmit power controller 1116. In some aspects, these components may provide functionality similar to the functionality of the similarly named components of FIG. 2.

Figure 12:
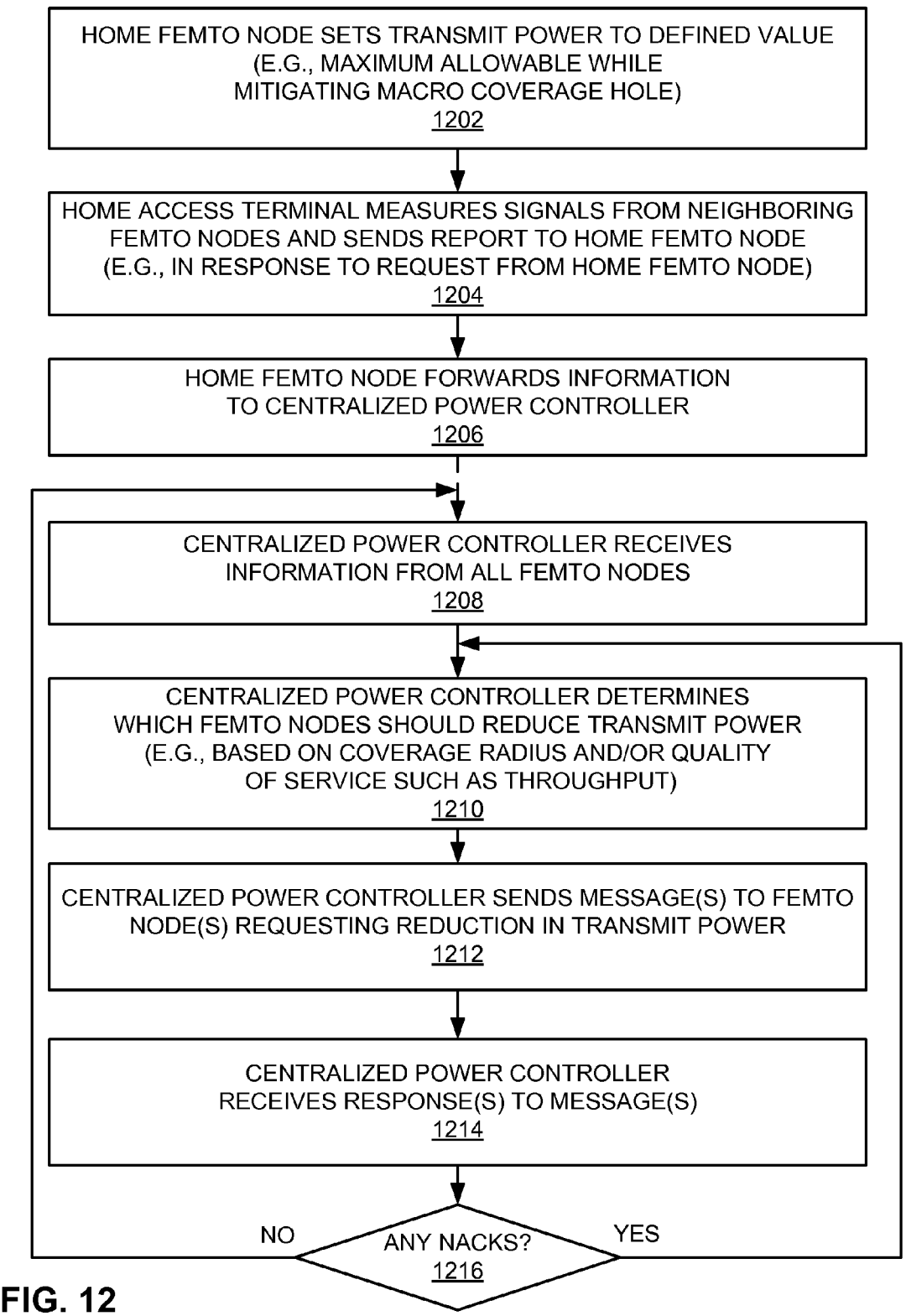
FIG. 12 is a flowchart of several sample aspects of operations that may be performed to control transmit power of an access node using centralized power control.

FIG. 12 describes various operations that may be performed in an implementation where a femto node (e.g., femto node 1104A) simply forwards the neighbor list information it receives from its associated access terminal (e.g., access terminal 1106A) to the centralized power controller 1102. The centralized power controller 1102 may then perform operations similar to those described above to request a femto node (e.g., femto node 1104B) that is in the vicinity of the femto node 1104A to reduce its transmit power.

The operations blocks 1202 and 1204 may be similar to the operations of blocks 902 and 904 discussed above. At block 1206, the femto node 1104A forwards a neighbor list 1108A it receives from the access terminal 1106A to the centralized power controller 1102. The operations of blocks 1202-1206 may be repeated on a regular basis (e.g., periodically) whenever the femto node 1104A receives a neighbor report from the access terminal 1106A.

As represented by block 1208, the centralized power controller 1102 may receive similar information from other femto nodes in the network. At block 1210, the centralized power controller 1102 may then perform operations similar to those discussed above (e.g., at block 906) to determine whether a femto node should reduce its transmit power. In some aspects, the centralized power controller 1102 may make a power control decision based on information it receives relating to conditions at multiple femto nodes. For example, if a given femto node is interfering with several other femto nodes, the centralized power controller 1102 may attempt to reduce the power of that femto node first.

At block 1212, the centralized power controller 1102 sends a message to each femto node that the centralized controller 1100 determines should reduce its transmit power. As above, this request may indicate the degree to which a designated femto node should reduce its power. These operations may be similar to the operations of blocks 912 and 914.

The centralized power controller 1102 receives responses from the femto nodes at block 1214. As represented by block 1216, if no NACKs are received in response to the requests issued at block 1212, the operational flow for the centralized power controller 1102 returns to block 1208 where the centralized controller 1102 continues to receive information from the femto nodes in the network and performs the power control operations described above.

If, on the other hand, one or more NACKs are received in response to the requests issued at block 1212, the operational flow for the centralized power controller 1102 returns to block 1210 where the centralized controller 1102 may identify other femto nodes that should reduce their transmit power and then sends out new power control messages. Again, these operations may be similar to blocks 912 and 914 discussed above.

Figure 13A:
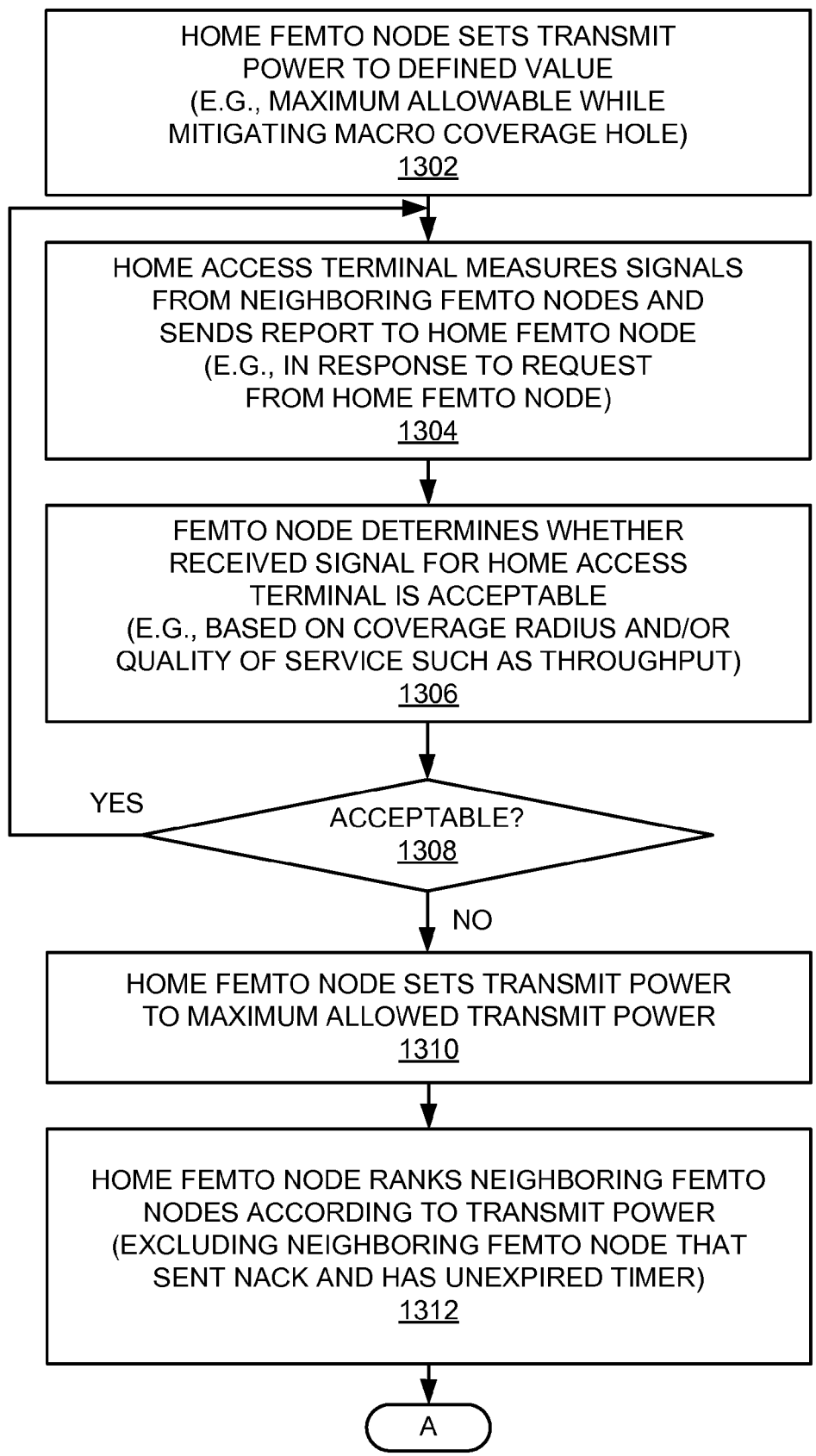
FIGS. 13A and 13B are a flowchart of several sample aspects of operations that may be performed to control transmit power of an access node using centralized power control.
Figure 13B:
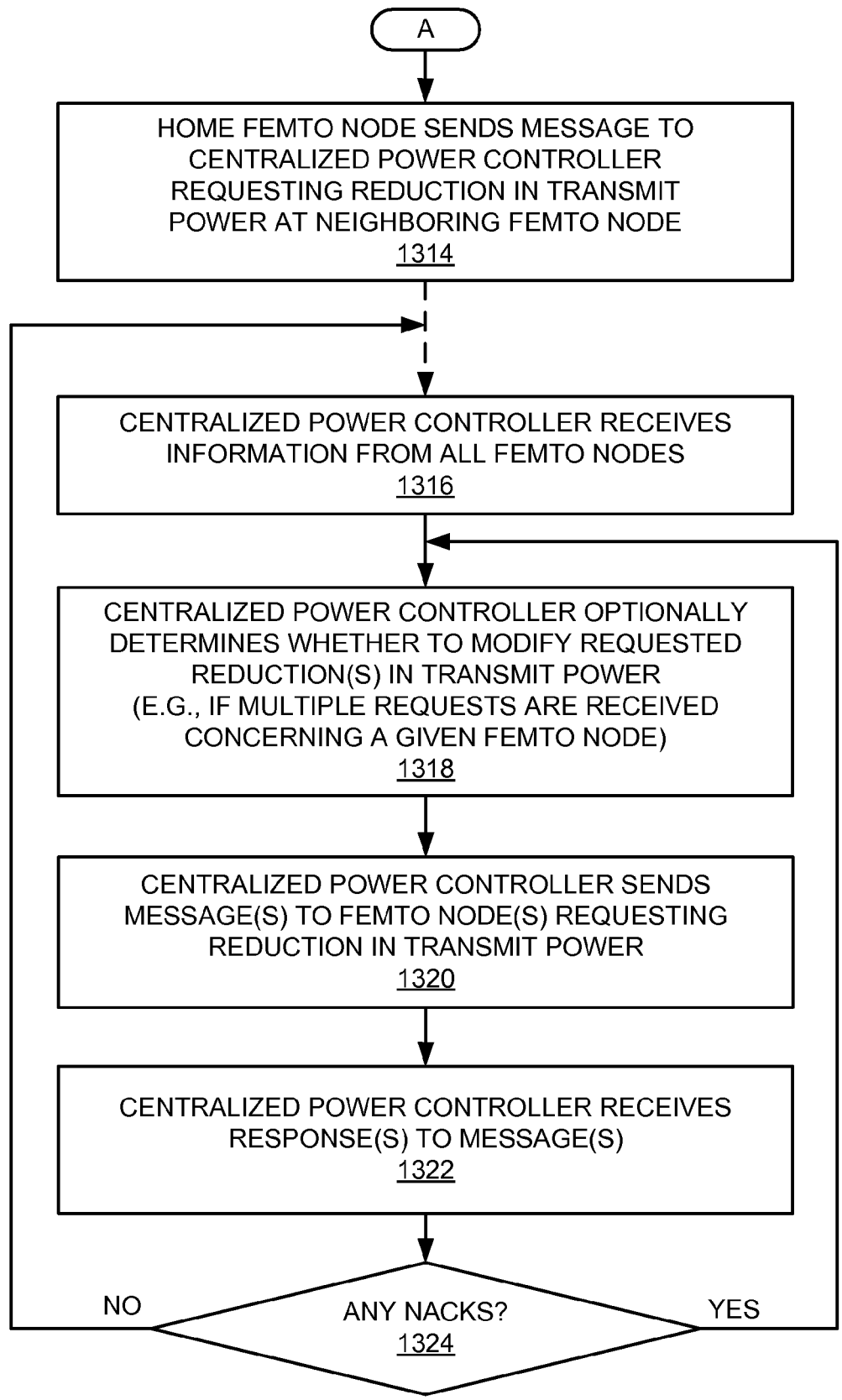

FIGS. 13A and 13B describe various operations that may be performed in an implementation where a femto node (e.g., femto node 1104A) identifies a neighboring femto node (e.g., femto node 1104B) that should reduce its power and sends this information to the centralized power controller 1102. The centralized power controller 1102 may then send a request to the femto node 1104B to reduce its transmit power.

The operations blocks 1302-1312 may be similar to the operations of blocks 902-912 discussed above. At block 1314, the femto node 1104A sends a message identifying the femto node 1104B to the centralized power controller 1102. Such a message may take various forms. For example, the message may simply identify a single femto node (e.g., femto node 1104B) or the message may comprise a ranking of femto nodes (e.g., as described above at block 912). Such a list also may include some or all of the neighbor report the femto node 1104A received from the access terminal 1106A. The operations of blocks 1302-1314 may be repeated on a regular basis (e.g., periodically) whenever the femto node 1104A receives a neighbor report from the access terminal 1106A.

As represented by block 1316, the centralized power controller 1102 may receive similar information from other femto nodes in the network. At block 1318, the centralized power controller 1102 may determine whether it should make any adjustments to any requests for reduction in transmit power it receives (e.g., based on other requests it receives requesting a reduction in power for the same femto node).

At block 1320, the centralized power controller 1102 may then send a message to each femto node that the centralized controller 1102 determines should to reduce its power. As above, this request may indicate the degree to which the designated femto node should reduce its power.

The centralized power controller 1102 receives responses from the femto nodes at block 1322. As represented by block 1324, if no NACKs are received in response to the requests issued at block 1320, the operational flow for the centralized power controller 1102 returns to block 1316 where the centralized controller 1102 continues to receive information from the femto nodes in the network and performs the power control operations described above.

If, on the other hand, one or more NACKs are received in response to the requests issued at block 1320, the operational flow for the centralized power controller 1102 returns to block 1318 where the centralized controller 1102 may identify other femto nodes that should reduce their transmit power and then sends out new power control messages (e.g., based on a ranked list received from the femto node 1104A).

In view of the above it should be appreciated that the teachings herein may provide an effective way of managing transmit power of neighboring access nodes. For example, in a static environment downlink transmit powers of the femto nodes may be adjusted to a static value whereby service requirements at all access terminals may be satisfied. Consequently, such a solution to be compatible with legacy access terminals since all channels may continuously be transmitted at constant powers. In addition, in a dynamic environment transmit powers may be dynamically adjusted to accommodate the changing service requirements of the nodes in the system.

Figure 14:
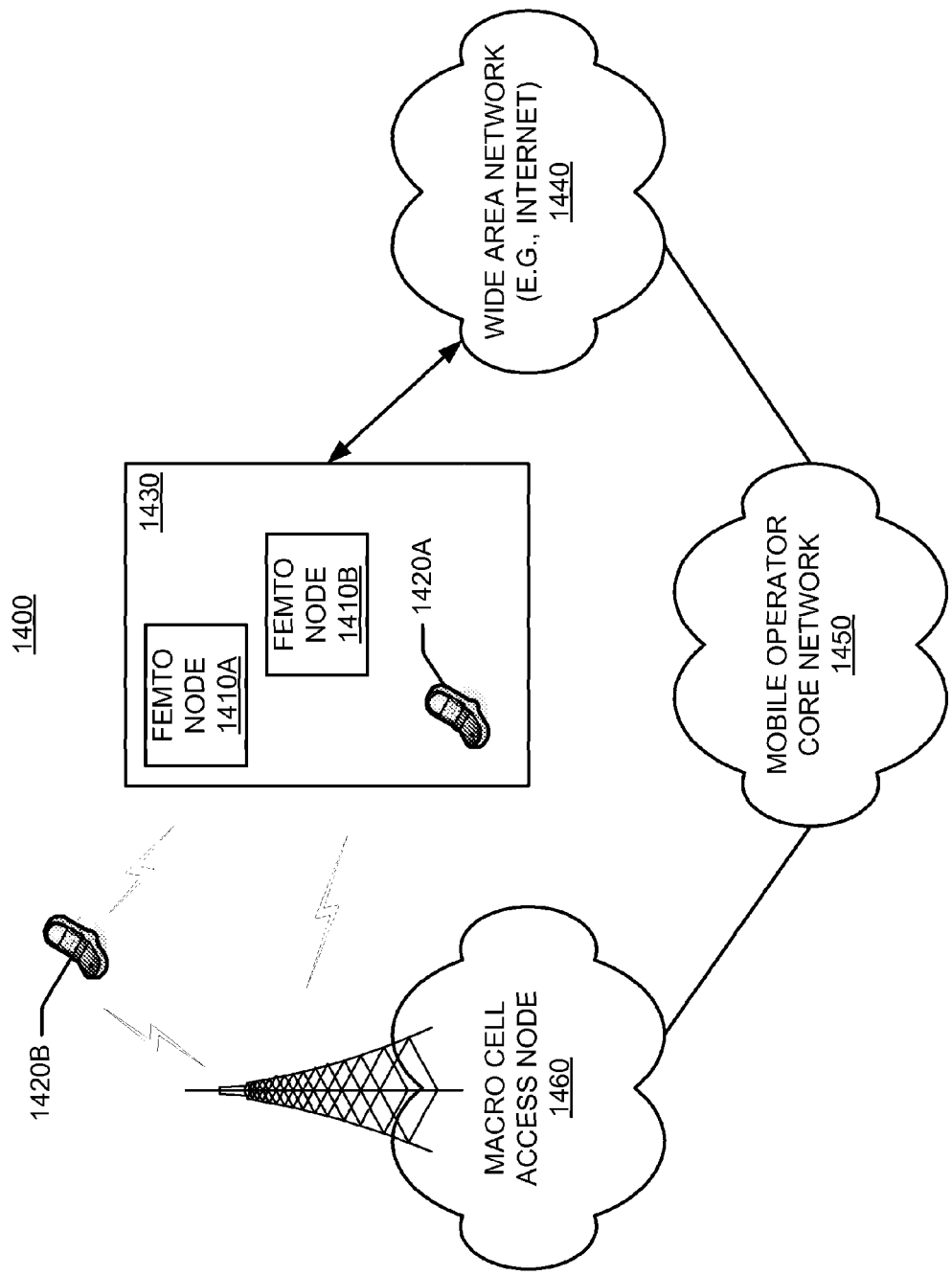
FIG. 14 is a simplified diagram of a wireless communication system including femto nodes.

Connectivity for a femto node environment may be established in various ways. For example, FIG. 14 illustrates an exemplary communication system 1400 where one or more femto nodes are deployed within a network environment. Specifically, the system 1400 includes multiple femto nodes 1410 (e.g., femto nodes 1410A and 1410B) installed in a relatively small scale network environment (e.g., in one or more user residences 1430). Each femto node 1410 may be coupled to a wide area network 1440 (e.g., the Internet) and a mobile operator core network 1450 via a DSL router, a cable modem, a wireless link, or other connectivity means (not shown). As discussed herein, each femto node 1410 may be configured to serve associated access terminals 1420 (e.g., access terminal 1420A) and, optionally, other access terminals 1420 (e.g., access terminal 1420B). In other words, access to femto nodes 1410 may be restricted whereby a given access terminal 1420 may be served by a set of designated (e.g., home) femto node(s) 1410 but may not be served by any non-designated femto nodes 1410 (e.g., a neighbor's femto node 1410).

The owner of a femto node 1410 may subscribe to mobile service, such as, for example, 3G mobile service offered through the mobile operator core network 1450. In addition, an access terminal 1420 may be capable of operating both in macro environments and in smaller scale (e.g., residential) network environments. In other words, depending on the current location of the access terminal 1420, the access terminal 1420 may be served by an access node 1460 of the macro cell mobile network 1450 or by any one of a set of femto nodes 1410 (e.g., the femto nodes 1410A and 1410B that reside within a corresponding user residence 1430). For example, when a subscriber is outside his home, he is served by a standard macro access node (e.g., node 1460) and when the subscriber is at home, he is served by a femto node (e.g., node 1410A). Here, it should be appreciated that a femto node 1410 may be backward compatible with existing access terminals 1420.

A femto node 1410 may be deployed on a single frequency or, in the alternative, on multiple frequencies. Depending on the particular configuration, the single frequency or one or more of the multiple frequencies may overlap with one or more frequencies used by a macro node (e.g., node 1460).

An access terminal 1420 may be configured to communicate either with the macro network 1450 or the femto nodes 1410, but not both simultaneously. In addition, an access terminal 1420 being served by a femto node 1410 may not be in a soft handover state with the macro network 1450.

In some aspects, an access terminal 1420 may be configured to connect to a preferred femto node (e.g., the home femto node of the access terminal 1420) whenever such connectivity is possible. For example, whenever the access terminal 1420 is within the user's residence 1430, it may be desired that the access terminal 1420 communicate only with the home femto node 1410.

In some aspects, if the access terminal 1420 operates within the macro cellular network 1450 but is not residing on its most preferred network (e.g., as defined in a preferred roaming list), the access terminal 1420 may continue to search for the most preferred network (e.g., the preferred femto node 1410) using a Better System Reselection ("BSR"), which may involve a periodic scanning of available systems to determine whether better systems are currently available, and subsequent efforts to associate with such preferred systems. With the acquisition entry, the access terminal 1420 may limit the search for specific band and channel. For example, the search for the most preferred system may be repeated periodically. Upon discovery of a preferred femto node 1410, the access terminal 1420 selects the femto node 1410 for camping within its coverage area.

The teachings herein may be employed in a wireless multiple-access communication system that simultaneously supports communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
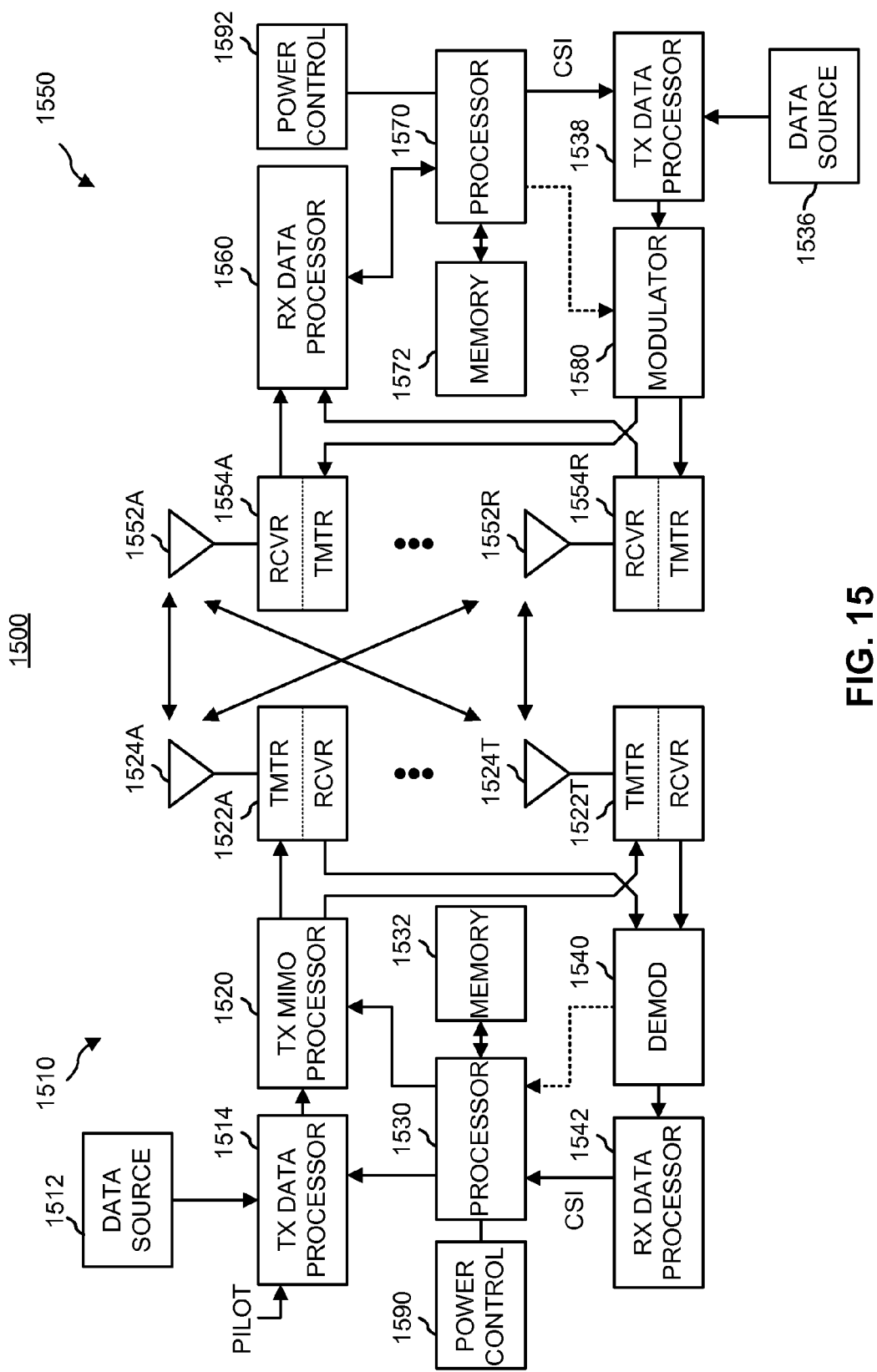
FIG. 15 is a simplified block diagram of several sample aspects of communication components.
Figure 16:
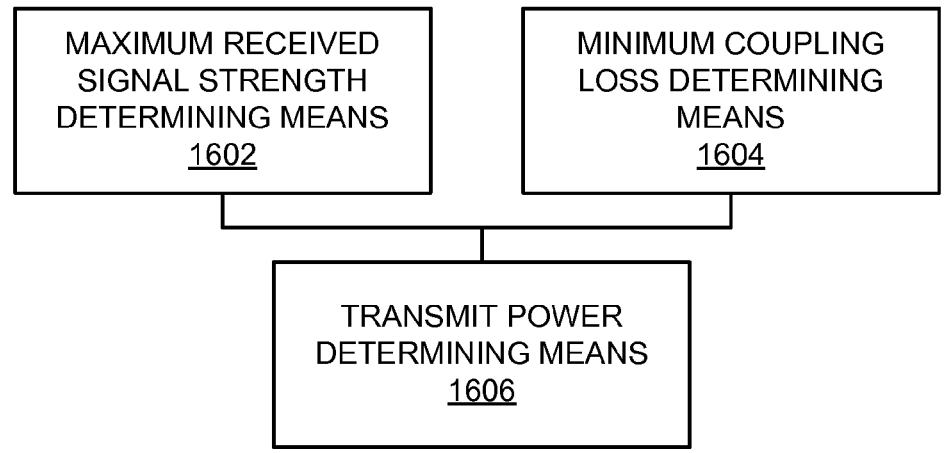
FIGS. 16-19 are simplified block diagrams of several sample aspects of apparatuses configured to provide power control as taught herein.
Figure 17:
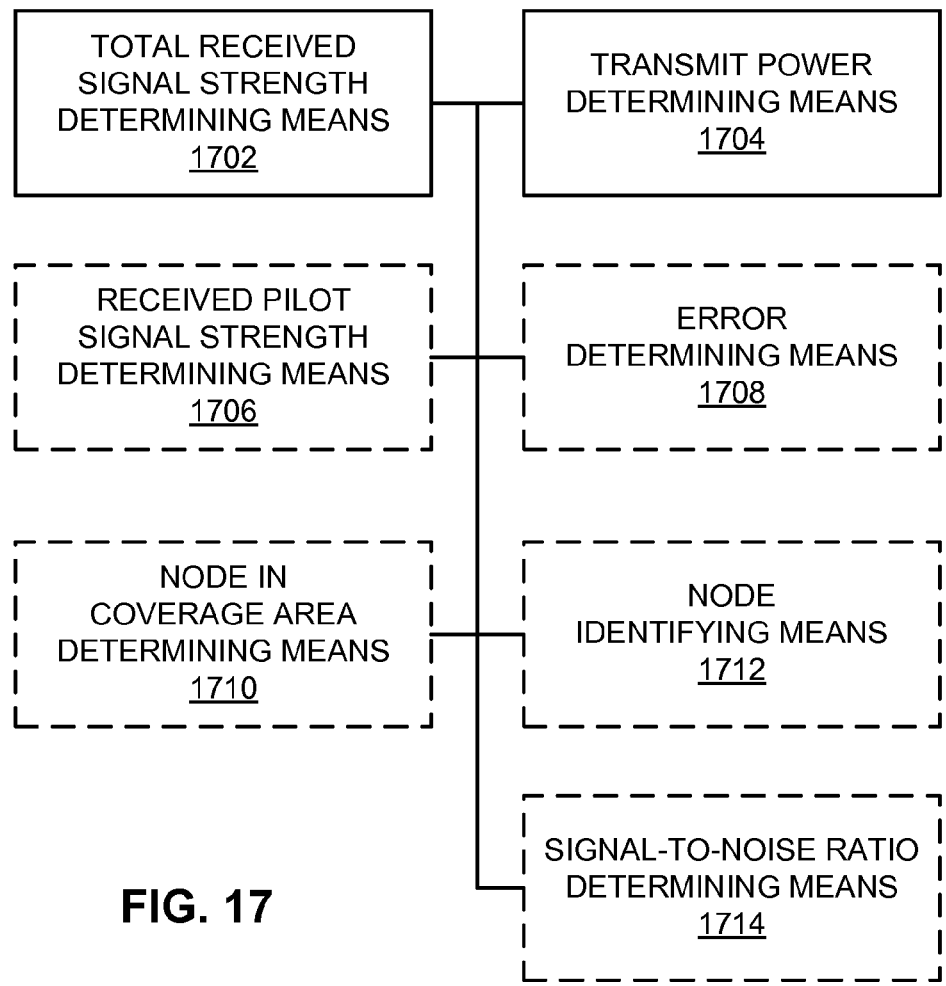
Figure 18:
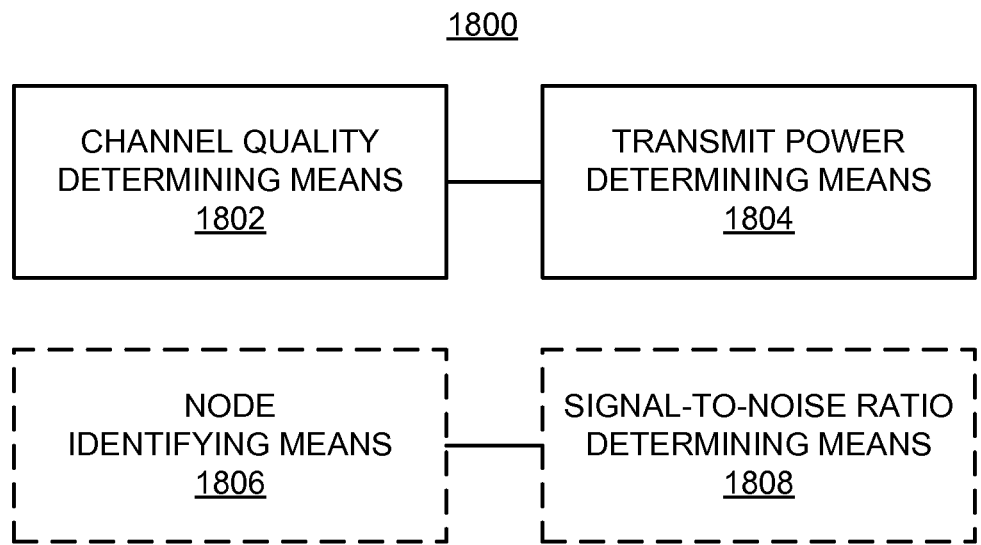
Figure 19:
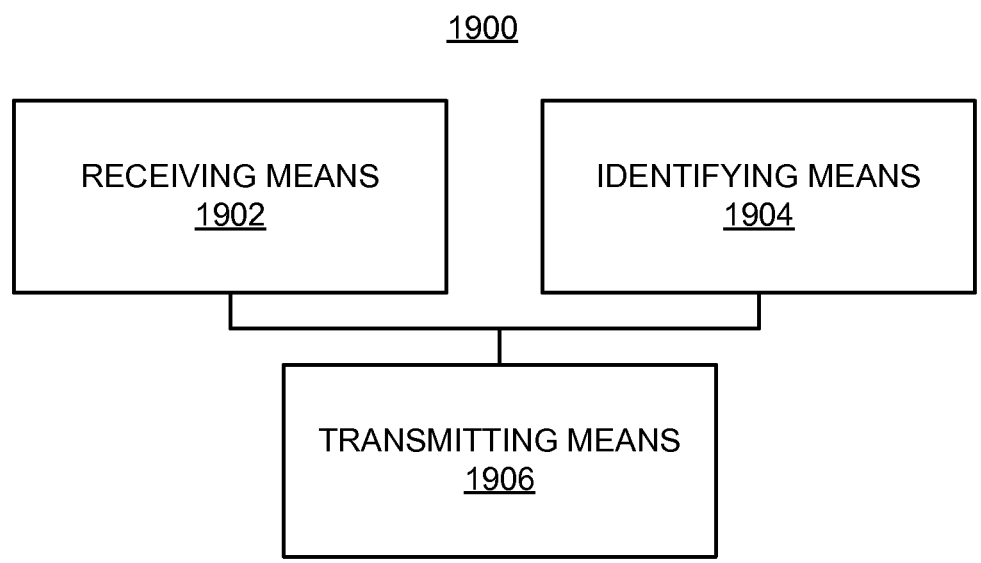

The teachings herein may be incorporated into a node (e.g., a device) employing various components for communicating with at least one other node. FIG. 15 depicts several sample components that may be employed to facilitate communication between nodes. Specifically, FIG. 15 illustrates a wireless device 1510 (e.g., an access point) and a wireless device 1550 (e.g., an access terminal) of a MIMO system 1500. At the device 1510, traffic data for a number of data streams is provided from a data source 1512 to a transmit ("TX") data processor 1514.

In some aspects, each data stream is transmitted over a respective transmit antenna. The TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers ("XCVR") 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the device 1550, the transmitted modulated signals are received by $N_R$ antennas 1552A through 1552R and the received signal from each antenna 1552 is provided to a respective transceiver ("XCVR") 1554A through 1554R. Each transceiver 1554 conditions (e.g., filters, amplifies, and downconverts) a respective received signal, digitizes the conditioned signal to provide samples, and further processes the samples to provide a corresponding "received" symbol stream.

A receive ("RX") data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which precoding matrix to use (discussed below). The processor 1570 formulates a reverse link message comprising a matrix index portion and a rank value portion. A data memory 1572 may store program code, data, and other information used by the processor 1570 or other components of the device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the device 1550 are received by the antennas 1524, conditioned by the transceivers 1522, demodulated by a demodulator ("DE-MOD") 1540, and processed by a RX data processor 1542 to extract the reverse link message transmitted by the device 1550. The processor 1530 then determines which pre-coding matrix to use for determining the beam-forming weights then processes the extracted message.

FIG. 15 also illustrates that the communication components may include one or more components that perform power control operations as taught herein. For example, a power control component 1590 may cooperate with the processor 1530 and/or other components of the device 1510 to send/receive signals to/from another device (e.g., device 1550) as taught herein. Similarly, a power control component 1592 may cooperate with the processor 1570 and/or other components of the device 1550 to send/receive signals to/from another device (e.g., device 1510). It should be appreciated that for each device 1510 and 1550 the functionality of two or more of the described components may be provided by a single component. For example, a single processing component may provide the functionality of the power control component 1590 and the processor 1530 and a single processing component may provide the functionality of the power control component 1592 and the processor 1570.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, High-Speed Downlink Packet Access ("HSDPA") systems, Time Division Multiple Access ("TDNM") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1×EV-DO RelO, RevA, RevB) technology and other technologies.

The teachings herein may be incorporated into (e.g., implemented within or performed by) a variety of apparatuses (e.g., nodes). For example, an access node as discussed herein may be configured or referred to as an access point ("AP"), base station ("BS"), NodeB, radio network controller ("RNC"), eNodeB, base station controller ("BSC"), base transceiver station ("BTS"), transceiver function ("TF"), radio router, radio transceiver, basic service set ("BSS"), extended service set ("ESS"), radio base station ("RBS"), a femto node, a pico node, or some other terminology.

In addition, an access terminal as discussed herein may be referred to as a mobile station, user equipment, subscriber unit, subscriber station, remote station, remote terminal, user terminal, user agent, or user device. In some implementations such a node may consist of, be implemented within, or include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem.

Accordingly, one or more aspects taught herein may consist of, be implemented within, or include variety types of apparatuses. Such an apparatus may comprise a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access node (e.g., an access point) for a communication system. Such an access node may provide, for example, connectivity for or to a network (e.g., a wide area network such as the Internet or a cellular network) via a wired or wireless communication link. Accordingly, the access node may enable another node (e.g., an access terminal) to access the network or some other functionality. In addition, it should be appreciated that one or both of the nodes may be portable or, in some cases, relatively non-portable. Also, it should be appreciated that a wireless node (e.g., a wireless device) also may be capable of transmitting and/or receiving information in a non-wireless manner via an appropriate communication interface (e.g., via a wired connection).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 16-19, apparatuses 1600-1900 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 16-19 are optional.

The apparatuses 1600-1900 may include one or more modules that may perform one or more of the functions described above with regard to various figures. For example, a maximum received signal strength determining means 1602 may correspond to, for example, a signal strength determiner as discussed herein. A minimum coupling loss determining means 1604 may correspond to, for example, a coupling loss determiner as discussed herein. A transmit power determining means 1606, 1704, or 1804 may correspond to, for example, a transmit power controller as discussed herein. A total received signal strength determining means 1702 may correspond to, for example, a signal strength determiner as discussed herein. A received pilot signal strength determining means 1706 may correspond to, for example, a received pilot strength determiner as discussed herein. An error determining means 1708 may correspond to, for example, an error determiner as discussed herein. A node in coverage area determining means 1710 may correspond to, for example, a node detector as discussed herein. A node identifying means 1712 or 1806 may correspond to, for example, a node detector as discussed herein. A signal-to-noise ratio determining means 1706 or 1808 may correspond to, for example, a signal-to-noise ratio determiner as discussed herein. A channel quality determining means 1802 may correspond to, for example, a channel quality determiner as discussed herein. A receiving means 1902 may correspond to, for example, a receiver as discussed herein. An identifying means 1904 may correspond to, for example, a transmit power controller as discussed herein. A transmitting means 1906 may correspond to, for example, a transmitter as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
identifying that a visitor access terminal that is not authorized to handoff to a non-macro base station has entered into a non-macro coverage area for the non-macro base station;
determining a channel quality value associated with a channel used by the visitor access terminal; and
determining, by a transmit power controller in response to the identifying, a transmit power value including a reduced maximum transmission power level at which the non-macro base station is permitted to transmit to a home subscriber terminal that is based on the determined channel quality value and is configured to limit interference caused by the non-macro base station upon the visitor access terminal.

2. The method of claim 1, wherein the determination of the transmit power value comprises adjusting the transmit power value based on a change in the determined channel quality value or based on a comparison of the determined channel quality value with a threshold.

3. The method of claim 1, wherein the determination of the channel quality value comprises receiving an indication of channel quality from the home subscriber terminal.

4. The method of claim 1, further comprising:
identifying that the home subscriber terminal is located substantially near an edge of the non-macro coverage area for the non-macro base station,
wherein the determination of the transmit power value is further based upon an estimated distance between the non-macro base station and the edge of the non-macro coverage area,
wherein the determined channel quality value corresponds to a signal-to-noise ratio associated with the home subscriber terminal; and
wherein the transmit power value is determined based on the determined signal-to-noise ratio and a defined maximum signal-to-noise ratio.

5. The method of claim 4, wherein the determination of the signal-to-noise ratio comprises receiving signal-to-noise ratio information from the home subscriber terminal.

6. The method of claim 4, wherein the determination that the home subscriber terminal is located substantially near the edge of the coverage area for the non-macro base station is based on a path loss between the home subscriber terminal and the non-macro base station.

7. The method of claim 1, wherein the visitor subscriber terminal is restricted for least one of the group consisting of: signaling, data access, registration, paging, and service to the non-macro base station.

8. The method of claim 1,
wherein the reduced maximum transmission power level is established for a common control channel, and
wherein the determined channel quality value indicates quality associated with the common control channel.

9. The method of claim 1, wherein the transmit power value comprises a downlink transmit power value for the non-macro base station.

10. The method of claim 1, wherein the reduced maximum transmission power level corresponds to a first preliminary maximum transmit power value, the method further comprising:
determining at least one other preliminary maximum transmit power value; and
determining the reduced maximum transmit power value based on a minimum of the first and at least one other preliminary maximum transmit power values.

11. The method of claim 1, wherein the channel quality value and the transmit power value are determined on a repeated basis.

12. The method of claim 1, wherein the non-macro base station corresponds to a femto node or a pico node.

13. The method of claim 1,
wherein an estimated distance between the non-macro base station and the edge of the non-macro coverage area for the non-macro base station is used in conjunction with the determined channel quality value to calculate the reduced maximum transmission power level.

14. The method of claim 1,
wherein the channel quality value is a predefined path loss value indicative of path loss between the non-macro base station and an edge of the non-macro coverage area, or
wherein the channel quality value is based on an indication of path loss on the channel to a first home subscriber terminal of the non-macro base station, or
wherein the channel quality value is independently calculated at the non-macro base station based on a measurement report from a second home subscriber terminal.

15. An apparatus for wireless communication, comprising:
a node detector configured to identify that a visitor access terminal that is not authorized to handoff to a non-macro base station has entered into a non-macro coverage area for the non-macro base station;
a channel quality determiner configured to determine a channel quality value associated with a channel used by the visitor access terminal; and
a transmit power controller configured to determine, in response to the identification, a transmit power value including a reduced maximum transmission power level at which the non-macro base station is permitted to transmit to a home subscriber terminal that is based on the determined channel quality value and is configured to limit interference caused by the non-macro base station upon the visitor access terminal.

16. The apparatus of claim 15, wherein the determination of the transmit power value comprises adjusting the transmit power value based on a change in the determined channel quality value or based on a comparison of the determined channel quality value with a threshold.

17. The apparatus of claim 15, wherein the determination of the channel quality value comprises receiving an indication of channel quality from the home subscriber terminal.

18. The apparatus of claim 15,
wherein the node detector is further configured to identify that the home subscriber terminal is substantially near an edge of the non-macro coverage area of the non-macro base station;
a signal-to-noise ratio determiner configured to determine a signal-to-noise ratio associated with the home subscriber terminal based on the determined channel quality value,
wherein the transmit power value is determined based on the determined signal-to-noise ratio and a defined maximum signal-to-noise ratio,
wherein the transmit power value is determined further based upon an estimated distance between the non-macro base station and the edge of the non-macro coverage area.

19. The apparatus of claim 18, wherein the determination of the signal-to-noise ratio comprises receiving signal-to-noise ratio information from the home subscriber terminal.

20. The apparatus of claim 15, wherein the visitor subscriber terminal is restricted for least one of the group consisting of:
signaling, data access, registration, paging, and service to the non-macro base station.

21. The apparatus of claim 15,
wherein the reduced maximum transmission power level is established for a common control channel, and
wherein the determined channel quality value indicates quality associated with the common control channel.

22. The apparatus of claim 15, wherein the non-macro base station corresponds to a femto node or a pico node.

23. An apparatus for wireless communication, comprising:
means for identifying that a visitor access terminal that is not authorized to handoff to a non-macro base station has entered into a non-macro coverage area for the non-macro base station;
means for determining a channel quality value associated with a channel used by the visitor access terminal; and
means for determining, in response to the identification, a transmit power value including a reduced maximum transmission power level at which the non-macro base station is permitted to transmit to a home subscriber terminal that is based on the determined channel quality value and is configured to limit interference caused by the non-macro base station upon the visitor access terminal.

24. The apparatus of claim 23, wherein the determination of the transmit power value comprises adjusting the transmit power value based on a change in the determined channel quality value or based on a comparison of the determined channel quality value with a threshold.

25. The apparatus of claim 23, wherein the determination of the channel quality value comprises receiving an indication of channel quality from the home subscriber terminal.

26. The apparatus of claim 23,
wherein the means for identifying identifies that the home subscriber terminal that is substantially near an edge of the non-macro coverage area for the non-macro base station,
means for determining a signal-to-noise ratio associated with the home subscriber terminal based on the determined channel quality value,
wherein the transmit power value is determined based on the determined signal-to-noise ratio and a defined maximum signal-to-noise ratio, wherein the transmit power value is determined further based upon an estimated distance between the non-macro base station and the edge of the non-macro coverage area.

27. The apparatus of claim 26, wherein the determination of the signal-to-noise ratio comprises receiving signal-to-noise ratio information from the home subscriber terminal.

28. The apparatus of claim 23, wherein the visitor subscriber terminal is restricted for least one of the group consisting of:
signaling, data access, registration, paging, and service to the non-macro base station.

29. The apparatus of claim 23,
wherein the reduced maximum transmission power level is established for a common control channel, and
wherein the determined channel quality value indicates quality associated with the common control channel.

30. The apparatus of claim 23, wherein the non-macro base station corresponds to a femto node or a pico node.

31. A non-transitory computer-readable medium containing instructions stored thereon, which, when executed by a computer, cause the computer to perform operations, the instructions comprising:
program code to identify that a visitor access terminal that is not authorized to handoff to a non-macro base station has entered into a non-macro coverage area for the non-macro base station;
program code to determine a channel quality value associated with a channel used by the visitor access terminal; and
program code to determine, in response to the identification, a transmit power value including a reduced maximum transmission power level at which the non-macro base station is permitted to transmit to a home subscriber terminal that is based on the determined channel quality value and is configured to limit interference caused by the non-macro base station upon the visitor access terminal.

32. The non-transitory computer-readable medium of claim 31, wherein the determination of the transmit power value comprises adjusting the transmit power value based on a change in the determined channel quality value or based on a comparison of the determined channel quality value with a threshold.

33. The non-transitory computer-readable medium of claim 31, wherein the determination of the channel quality value comprises receiving an indication of channel quality from the home subscriber terminal.

34. The non-transitory computer-readable medium of claim 31, further comprising:
program code to identify that the home subscriber terminal is located substantially near an edge of the non-macro coverage area for the non-macro base station,
program code to determine a signal-to-noise ratio associated with the home subscriber terminal based on the determined channel quality value,
wherein the transmit power value is determined based on the determined signal-to-noise ratio and a defined maximum signal-to-noise ratio,
wherein the transmit power value is determined further based upon an estimated distance between the non-macro base station and the edge of the non-macro coverage area.

35. The non-transitory computer-readable medium of claim 34, wherein the determination of the signal-to-noise ratio comprises receiving signal-to-noise ratio information from the home subscriber terminal.

36. The non-transitory computer-readable medium of claim 31, wherein the visitor subscriber terminal is restricted for least one of the group consisting of:
signaling, data access, registration, paging, and service to the non-macro base station.

37. The non-transitory computer-readable medium of claim 31,
wherein the reduced maximum transmission power level is established for a common control channel, and
wherein the determined channel quality value indicates quality associated with the common control channel.

38. The non-transitory computer-readable medium of claim 31, wherein the non-macro base station corresponds to a femto node or a pico node.

* * * * *